United States Patent [19]

Watanabe et al.

[11] Patent Number: 4,883,781
[45] Date of Patent: Nov. 28, 1989

[54] HEAT RESISTING LOW EXPANSION ZIRCONYL PHOSPHATE-ZIRCON COMPOSITE

[75] Inventors: Keiichiro Watanabe; Tsuneaki Ohashi, both of Nagoya, Japan

[73] Assignee: NGK Insulators, Ltd., Nagoya, Japan

[21] Appl. No.: 94,743

[22] Filed: Sep. 9, 1987

[30] Foreign Application Priority Data

Sep. 13, 1986 [JP] Japan .................. 61-215010
May 28, 1987 [JP] Japan .................. 62-129873
May 28, 1987 [JP] Japan .................. 62-129874

[51] Int. Cl.$^4$ .................. C04B 35/16; C04B 35/48
[52] U.S. Cl. .................. 501/102; 501/106
[58] Field of Search .................. 501/102, 106

[56] References Cited

U.S. PATENT DOCUMENTS 4,703,023 10/1987 Yamai .................. 501/102

FOREIGN PATENT DOCUMENTS 3609730 9/1986 Fed. Rep. of Germany ...... 501/102

OTHER PUBLICATIONS

"Synthesis and Thermal Expansion of MZR$_4$P$_6$O$_{24}$ (M=Mg, Ca, Sr, Ba)", J. Am. Ceram., Soc., 70[10]C-2322-C-236 (1987).

Primary Examiner—Mark L. Bell
Attorney, Agent, or Firm—Arnold, White & Durkee

[57] ABSTRACT

Heat resisting low expansion zirconyl phosphate-zircon composite bodies are disclosed, which contain zirconyl phosphate and zircon as a main crystalline phase and a secondary crystalline phase, respectively. The heat resisting low expansion zirconyl phosphate-zircon composite bodies have a coefficient of thermal expansion in a temperature range from room temperature to 1,400° C. being not more than $30 \times 10^{-7}$/° C. and a melting point being not less than 1,600° C. The composite bodies have a chemical composition essentially consisting of 58.2 to 65.4% by weight of $ZrO_2$, 17.4 to 37.1% by weight of $P_2O_5$, and 1.5 to 19.0% by weight of $SiO_2$. The heat resisting low expansion zirconyl phosphate-zircon composite bodies optionally contain MgO and $Al_2O_3$ in a total amount of not more than 2.5% by weight or 0.1 to 4% by weight of $Nb_2O_5$. A process for producing such zirconyl phosphate-zircon composite bodies is also disclosed.

19 Claims, 16 Drawing Sheets

HEAT RESISTING LOW EXPANSION ZIRCONYL PHOSPHATE-ZIRCON COMPOSITE

BACKGROUND OF THE INVENTION (1) Field of the Invention

The present invention relates to low expansion ceramic materials and a process for producing these ceramic materials. More particularly, the invention relates to zirconyl phosphate-zircon base low expansion ceramic materials having excellent thermal shock resistance and heat resistance, and to a process for producing such ceramic materials.

(2) Related Art Statement

With advances in recent industrial technology, demands for materials having excellent heat resistance and thermal shock resistance have increased. The thermal shock resistance of ceramic materials is influenced by physical properties of the materials such as coefficient of thermal expansion, heat conductivity, strength, modulus of elasticity, Poisson ratio, etc, and is also influenced by sizes and configurations of resulting articles and heating and cooling process, that is, a heat flow speed.

Among these factors influencing the thermal shock resistance, the coefficient of thermal expansion particularly has the greatest contributory percentage. It is known that particularly when the heat flow speed is large, the thermal shock resistance is largely influenced solely by the coefficient of thermal expansion. Under these circumstances, development of low expansion materials having excellent thermal shock resistance have earnestly been demanded.

As relatively low expansion ceramic materials having a coefficient of thermal expansion of around 5 to $20 \times 10^{-7}$ (1/C°) in a temperature range from 40° C. to 800° C., cordierite (MAS), lithium-aluminum-silicate (LAS), and the like are known. The melting points of these materials specifically are low, the melting point of cordierite is 1,450° C. and LAS has a melting point of 1,423° C. For instance, in the case of ceramic honeycomb structures used as catalyst substrates for automobile catalyst purifiers, a fitting position of a catalyst converter is changed from a conventional underbed to near an engine to improve catalytic purifying efficiency, or a temperature of exhaust gases increases due to design changes, for instance, attachment of a turbocharger to improve fuel mileage and engine output. Consequently, since a temperature of catalyst beds increases by 100° to 200° C., it has been discovered that even a cordierite base honeycomb structural substrate having a high melting point may clog due to melting. Accordingly, development of low expansion materials having thermal shock resistance equivalent to or superior to that of cordierite as well as excellent heat resistance have strongly been desired.

As ceramic materials having relatively low thermal expansion and high heat resistance, mullite ($3Al_2O_3 \cdot 2SiO_2$, coefficient of thermal expansion: $53 \times 10^{-7}$/°C., melting point: 1,750° C.) and zircon ($ZrO_2 \cdot SiO_2$, coefficient of thermal expansion: $42 \times 10^{-7}$/°C., melting point: 1,720° C.) are available. However, they have drawbacks that their coefficients of thermal expansion are both high and consequently their thermal shock resistance is low.

As known examples of low expansion ceramic materials mainly consisting of zirconyl phosphate, there are high strength zirconyl phosphate sintered bodies disclosed in Japanese patent publication No. 61-12,867 which each contain 2 to 10 mol % of a mixture of $SiO_2/Nb_2O_5$ at a mixing molar ratio of 1 to 8 and 1 to 6 mol% of $Al_2O_3$; low expansion zirconium phosphate porcelains disclosed in Japanese patent application laid-open No. 61-21,853 which each contain 0.5 to 0.6% by weight of magnesium phosphate as a sintering aid; low thermal expansion zirconyl phosphate ceramic materials disclosed in Japanese patent application Laid-open No. 61-219,753 which contain at least one kind of a material selected from the group consisting of AnO, MgO, $Bi_2O_3$, $MnO_2$, $Co_2O_3$, NiO, $TiO_2$, $CeO_2$, $Nb_2O_5$ and $Ta_2O_5$ as a sintering aid and a group consisting of $SiO_2$ and a silicate as a grain growth retardant in a total amount of 0.3 to 10% by weight, an amount o f said at least one kind of the material from each of the groups being not less than 0.1% by weight; zirconium phosphate ceramic materials disclosed in Ceramic Technology Study Annual Report No. 9, pp 23 to 30 (1982) published by Nogoya Institute of Technology, which each contain 2% by weight of an additive such as MgO, $MnO_2$, $Fe_2O_3$, ZnO, etc. However, none of the above ceramic materials contain zircon as a secondary phase and their heat resistance is not good because their sintering mechanism is a liquid phase sintering utilizing production of a liquid phase having a low melting point. Thus, such techniques could not meet the above-mentioned demands.

SUMMARY OF THE INVENTION

It is an object of the present invention to eliminate the above-mentioned problems, and to provide zirconyl phosphate-zircon composite bodies having high heat resistance and a low coefficient of thermal expansion and a process for producing the same.

According to a first aspect of the present invention, there are provided heat resisting low expansion zirconyl phosphate-zircon composite bodies which contain zirconyl phosphate and zircon as a main crystalline phase and a secondary crystalline phase, respectively, wherein a coefficient of thermal expansion in a temperature range from room temperature to 1,400° C. is not more than $30 \times 10^{-7}$/°C. and a melting point is not less than 1,600° C.

According to a second aspect of the present invention, heat resisting low expansion zirconyl phosphate-zircon composite bodies are provided which contain 58.2 to 65.4% by weight of $ZrO_2$, 17.4 to 37.1% by weight of $P_2O_5$ and 1.5 to 19.0% by weight of $SiO_2$ in the chemical composition.

According to a third aspect of the present invention, heat resisting low expansion zirconyl phosphate-zircon composite bodies are provided which have a chemical composition essentially consisting of 61.3 to 65.4% by weight of $ZrO_2$, 18.3 to 37.1% by weight of $P_2O_5$ and 1.6 to 16.4% by weight of $SiO_2$, wherein zirconyl phosphate and zircon are contained as a main crystalline phase and a secondary crystalline phase, respectively, a coefficient of thermal expansion in a temperature range from room temperature to 1,400° C. is not more than $30 \times 10^{-7}$/°C., and a melting point is not less than 1,600° C.

According to a fourth aspect of the present invention, there are provided heat resisting low expansion zirconyl phosphate-zircon composite bodies which have a chemical composition essentially consisting of 58.2 to 65.3% by weight of $ZrO_2$, 17.4 to 37.1% by weight of $P_2O_5$, 1.6 or 19.0% by weight of $SiO_2$, and the balance being MgO and $Al_2O_3$ in a total amount of not more than 2.5% by weight, wherein zirconyl phosphate and zircon are contained as a main crystalline phase and a secondary crystalline phase, respectively, a coefficient of thermal expansion in a temperature range from room temperature to 1,400° C. is not more than $30\times10^{-7}/°C.$, and a melting point is not less than 1,600° C.

According to a fifth aspect of the present invention, there are provided heat resisting low expansion zirconyl phosphate-zircon composite bodies which have a chemical composition essentially consisting of 58.8 to 65.3% by weight of $ZrO_2$, 17.6 to 37.1% by weight of $P_2O_5$, 1.5 to 16.4% by weight of $SiO_2$, and 0.1 to 4% by weight of $Nb_2O_5$, wherein zirconyl phosphate and zircon are contained as a main crystalline phase and a secondary crystalline phase, respectively, a coefficient of thermal expansion in a temperature range from room temperature to 1,400° C. is not more than $30\times10^{-7}/°C.$ and a melting point is not less than 1,600° C.

According to a sixth aspect of the present invention, a process is provided for producing zirconyl phosphate-zircon composite bodies which contain zirconyl phosphate and zircon as a main crystalline phase and a secondary crystalline phase, respectively, and have a coefficient of thermal expansion in a temperature range from room temperature to 1,400° C. being not more than $30\times10^{-7}/°C.$ and a melting point being not less than 1,600° C., said process comprising adding 5 to 50% by weight of zircon ($ZrSiO_4$) to zirconyl phosphate $\{(ZrO)_2P_2O_7\}$ and sintering a thus obtained mixture.

In the above compositions, the composite bodies are obtained by coexisting zircon ($ZrSiO_4$) having high heat resistance and relatively low expansion with zirconyl phosphate $\{(ZrO)_2P_2O_7\}$ as a low expansion ceramic material. Thus, ceramic materials having excellent heat resistance and thermal shock resistance in which a coefficient of thermal expansion in a temperature range from room temperature to 1,400° C. of not more than $30\times10^{-7}/°C.$ and a melting point is not less than 1,600° C. can be obtained.

These and other objects, features and advantages of the invention will be appreciated upon reading of the following description of the invention when taken in conjunction with the attached drawings, with understanding that some modifications, variations, and changes of the same could be made by those skilled in the art to which the invention pertains without departing from the spirit of the invention or the scope of the claims appended hereto.

BRIEF DESCRIPTION OF THE DRAWINGS

For a better understanding of the invention, reference is made to the attached drawings, wherein.

DETAILED DESCRIPTION OF THE INVENTION

Figure 1:
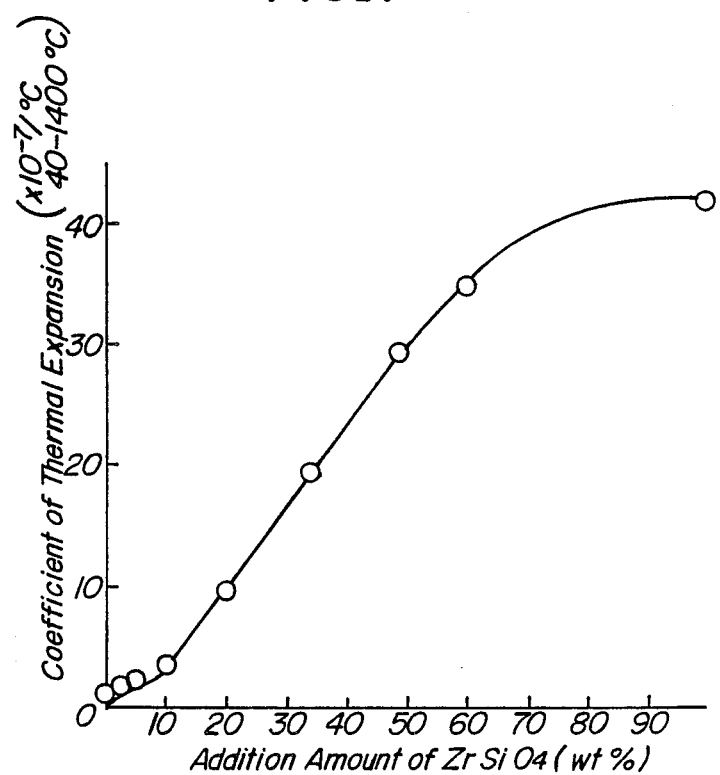
FIG. 1 is a diagram showing the dependency of the coefficient of thermal expansion of zirconyl phosphate-zircon composite bodies according to the third aspect of the present invention upon an addition amount of zircon.

Zircon coexisting with zirconyl phosphate is to compensate for difficulties associated with the sinterability of zirconyl phosphate, thereby promoting sintering. Further, since zirconyl phosphate readily produces a liquid phase of a low melting point together with an oxide of an alkali metal or an alkaline earth metal, it gives a low strength sintered body through abnormal grain growth or causes a softening deformation at high temperatures if such an impurity exists. However, such abnormal grain growth and softening deformation at high temperatures can be restrained by coexisting zircon. In the sintered body in which zircon is coexisting, an open porosity is reduced with strength being increased by further additions of MgO, $Al_2O_3$ and $SiO_2$ without lowering heat resistance.

The reason why the addition amount of zircon to zirconyl phosphate is limited to 5 to 50% by weight in the producing process according to the present invention is that if zircon is less than 5% by weight, a desired strength cannot be obtained, while if it exceeds 50% by weight, the coefficient of thermal expansion becomes larger. In this case, it is necessary that with respect to the chemical composition, $ZrO_2$, $P_2O_5$, and $SiO_2$ are 58.2 to 65.4% by weight, 17.4 to 37.1% by weight, and 1.5 to 19.0% by weight, respectively. If $ZrO_2$ exceeds 65.4% by weight, m-$ZrO_2$ precipitates to result in high expansion, while if it is less than 58.2% by weight, $ZrP_2O_7$ precipitates to also result in high expansion. If $P_2O_5$ is over 37.1% by weight, $ZrP_2O_7$ precipitates to result in high expansion, while if it is less than 17.4% by weight, m-$ZrO_2$ precipitates to result in high expansion. If $SiO_2$ exceeds 19.0% by weight, over 50% by weight of zircon precipitates to result in high expansion, while if it is less than 1.5% by weight, less than 5% by weight of zircon precipitates to exhibit an insufficient strength-improving effect. A range from 5 to 35% by weight of zircon to zirconyl phosphate is preferable. In this case, it is necessary that with respect to the chemical composition, $ZrO_2$, $P_2O_5$ and $SiO_2$ are 58.2 to 64.8% by weight, 22.5 to 37.1% by weight, and 1.5 to 14.1% by weight, respectively.

The reason why MgO, $Al_2O_3$ and $SiO_2$ are added in a form of a cordierite compound is that since a cordierite phase has the relatively high melting point and stable, abnormal grain growth occurring in the sintered body when these additives are independently added can be controlled.

It is preferable from the standpoint of improving the heat resistance that the total content of oxides of an alkali metal, and an alkaline earth metal contained in the heat resisting low expansion ceramic materials according to the present invention excluding MgO is not more than 0.5% by weight. For this purpose, it is preferable to use, as starting materials, a zirconyl phosphate starting material and a zircon starting material each containing not more than 0.5% by weight of the oxides of the alkali metal and the alkaline earth metal and a cordierite starting material containing not more than 1% by weight of the oxide of the alkali metal and an alkaline earth metal excluding MgO so as to control the content of the oxide of the alkali metal and alkaline earth metal in the sintered body.

It is preferable that the molar ratio of $ZrO_2/P_2O_5$ in the zirconyl phosphate starting material is from 1.80 to 20.00. By using the zirconyl phosphate starting material having the molar ratio restricted in such a range, m-$ZrO_2$ can be prevented from precipitating in the sintered body, the coefficient of thermal expansion of the sintered body can be lessened, and abnormal expansion-shrinkage due to a phase transformation of m-$ZrO_2$ precipitated can be restrained. Since the abnormal expansion-shrinkage of the precipitated m-$ZrO_2$ reversible occurs at a temperature of around 1,000° C., the sintered body is damaged during use in heat cycling, which is very harmful from the standpoint of the practical application because of lowered strength and dimensional change due to microcrack growth.

In the following, an aspect of the present invention will be explained with reference to specific examples. They are merely given in illustration of the invention, but should never be interpreted to limit the scope of the invention..

After adjustment of the grain size, zirconyl phosphate, zircon, magnesia, mullite, aluminum phosphate, alumina, spinel, and kaolin were mixed together according to a compounding recipe given in Table 1. The grain size of the zirconyl phosphate was adjusted by using a vibration mill, a pot mill or an attritor mill in which 5 mm diameter $ZrO_2$ sintered grinding media were filled. As the $ZrO_2$ sintered grinding media, $ZrO_2$ stabilized with MgO or $Y_2O_3$ was used. The chemical compositions of the grinding media used are shown in Table 2. Chemical analysis values of the starting materials used are shown in Table 3.

Figure 7:
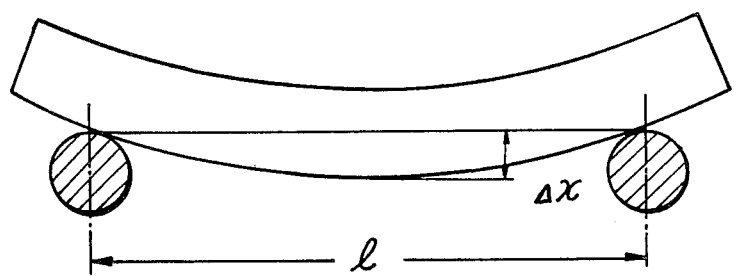
FIG. 7 is a view showing a method of measuring the self-weight softening percentage.

5 parts by weight of a 10% PVA aqueous solution was added to 100 parts by weight of a formulated mixture shown in Table 1, which were fully mixed, press molded by a mold of 25×80×6 mm at a pressure of 100 kg/cm², and pressed with rubber at a pressure of 2 ton/cm², followed by drying. The dried molding was fired in air in an electric furnace under conditions shown in Table 1. The temperature rising speed was from 5° C./h to 1,700° C./h. After the firing, the fired sintered body was machined in the form of a 3×4×40 mm flexural strength test piece such as shown in JIS R 1601(1981), and the coefficient of thermal expansion at a temperature range from 40° to 1,400° C., the four point flexural strength, the self-weight softening percentage, an open porosity and a melting point of the test piece were measured. In the measurement of the coefficient of thermal expansion, a push rod indication type thermal expansion metal using a high purity alumina sintered body was employed. The measurement temperature range was from 40° to 1,400° C. The four point flexural strength was measured according to a method described in JIS R 1601. The self-weight softening percentage was determined according to the following equation by placing the above flexural strength test piece of 3×4×40 mm on supports separated as in FIG. 7 at a span of 30 mm, heating it in air at 1,300° C. for 5 hours, and measuring a self-weight displacement $\Delta x$.

Self-weight softening percentage=$\Delta x/l \times 100 (\%)$ In the above equation, "l" is a distance between the supports(=30 mm).

The open porosity was measured according to an Archimedean method. With respect to the melting point, whether a sintered body cut in the form of $3\times4\times5$ mm was melt or not was visually judged when it was heated in an electric furnace at 1,650° C. for 10 minutes. Amounts of crystalline phases in the sintered body were quantitatively measured by the intensity of a (101) reflected peak of zircon ($ZrSiO_4$) and the intensity of a (002) reflected peak of zirconyl phosphate $\{\beta(ZrO)_2P_2O_7\}$. With respect to other different crystalline phases, their presence or absence only were detected from an X-ray diffraction pattern.

Note: Communications of the American Ceramic Society, C-80 (1984)

TABLE 1(a)

|  | Example | | | | | | | Comparative Example | | |
|---|---|---|---|---|---|---|---|---|---|---|
|  | 1 | 2 | 3 | 4 | 5 | 6 | 7 | 11 | 12 | 13 |
| Chemical composition (wt %) | | | | | | | | | | |
| $ZrO_2$ | 62.25 | 62.49 | 62.96 | 63.62 | 64.32 | 63.85 | 62.02 | 62.35 | 61.73 | 65.84 |
| $P_2O_5$ | 35.68 | 33.77 | 29.95 | 24.63 | 18.97 | 28.87 | 29.96 | 29.65 | 29.36 | 27.28 |
| $SiO_2$ | 1.66 | 3.31 | 6.61 | 11.20 | 16.09 | 6.70 | 7.40 | 6.55 | 6.48 | 6.69 |
| MgO | 0.34 | 0.33 | 0.30 | 0.27 | 0.23 | 0.40 | 0.19 | 1.27 | 2.24 | 0.02 |
| CaO | 0.01 | 0.01 | 0.03 | 0.05 | 0.07 | 0.04 | 0.22 | 0.03 | 0.04 | 0.03 |
| NaKO | 0.03 | 0.03 | 0.04 | 0.04 | 0.05 | 0.02 | 0.06 | 0.04 | 0.04 | 0.01 |
| $Al_2O_3$ | 0.03 | 0.06 | 0.11 | 0.19 | 0.27 | 0.12 | 0.15 | 0.11 | 0.11 | 0.13 |
| Compounding rate (wt %) | | | | | | | | | | |
| zirconyl phosphate B ($ZrO_2/P_2O_5 = 1.90$) | 95 | 90 | 80 | 66 | 51 | | | 79.2 | 78.4 | |
| zirconyl phosphate C ($ZrO_2/P_2O_5 = 2.00$) | | | | | | 80 | | | | |
| zirconyl phosphate D ($ZrO_2/P_2O_5 = 1.70$) | | | | | | | | | | |
| zirconyl phosphate E ($ZrO_2/P_2O_5 = 2.20$) | | | | | | | | | | 80 |
| zirconyl phosphate A ($ZrO_2/P_2O_5 = 1.80$) | | | | | | | 80 | 19.8 | 19.6 | |
| zircon ($ZrO_2/SiO_2 = 1.00$) | 5 | 10 | 20 | 34 | 49 | 20 | 20 | 1 | 2 | 20 |
| MgO | | | | | | | | | | |
| mullite | | | | | | | | | | |
| $AlPO_4$ | | | | | | | | | | |
| alumina | | | | | | | | | | |
| spinel | | | | | | | | | | |
| kaolin | | | | | | | | | | |
| Firing conditions | | | | | | | | | | |
| firing temperature (°C.) | 1,600 | 1,600 | 1,600 | 1,550 | 1,400 | 1,650 | 1,600 | 1,600 | 1,600 | 1,500 |
| firing time (h) | 5 | 5 | 5 | 10 | 20 | 3 | 5 | 5 | 5 | 10 |
| Crystalline phase (wt %) | | | | | | | | | | |
| zirconyl phosphate | 95 | 90 | 80 | 66 | 51 | 80 | 80 | 80 | 80 | |
| zircon | 5 | 10 | 20 | 34 | 49 | 20 | 20 | 20 | 20 | |
| m-$ZrO_2$ | | | | | | | | | | w |
| $AlPO_4$ | | | | | | | | | | |
| Physical properties of sintered body | | | | | | | | | | |
| CTE ($\times 10^{-7}$/°C., 40~1400° C.) | 2 | 5 | 9.5 | 19.5 | 29.5 | 13 | 20 | | | 40 |
| 4-point flexural strength (kg/mm²) | 3.8 | 5.0 | 7.6 | 9.6 | 12.0 | 6.2 | 5.9 | * | * | |
| self-weight softening percentage (%, 1300° C. × 5 h) | 0.02 | 0.01 | 0.02 | 0.00 | 0.02 | 0.05 | 0.06 | | | |
| open porosity (%) | 40 | 25 | 13 | 5 | 2 | 20 | 22 | | | |
| melting point (°C.) | >1,650 | >1,650 | >1,650 | >1,650 | 1,650 | >1,650 | >1,650 | | | |

*Grain growth was conspicuous and sample was broken during processing. w: weak

TABLE 1(b)

|  | Comparative Example | | | | | | | | | |
|---|---|---|---|---|---|---|---|---|---|---|
|  | 14 | 15 | 16 | 17 | 18 | 19 | 20 | 21 | 22 | 23 |
| Chemical composition (wt %) | | | | | | | | | | |
| $ZrO_2$ | 60.66 | 62.02 | 62.11 | 64.82 | 66.65 | 49.46 | 49.56 | 49.35 | 49.49 | 50.79 |
| $P_2O_5$ | 31.29 | 37.60 | 36.83 | 14.85 | 0.00 | 29.98 | 41.50 | 29.92 | 30.01 | 30.79 |
| $SiO_2$ | 7.09 | 0.00 | 0.67 | 19.66 | 32.49 | 5.54 | 0.00 | 0.00 | 0.00 | 11.48 |
| MgO | 0.47 | 0.35 | 0.35 | 0.21 | 0.11 | 0.32 | 0.28 | 0.28 | 5.73 | 0.40 |
| CaO | 0.20 | 0.00 | 0.00 | 0.08 | 0.13 | 0.06 | 0.00 | 0.01 | 0.00 | 0.06 |
| NaKO | 0.05 | 0.03 | 0.03 | 0.05 | 0.07 | 0.12 | 0.02 | 0.09 | 0.02 | 0.28 |
| $Al_2O_3$ | 0.24 | 0.00 | 0.01 | 0.33 | 0.55 | 14.52 | 8.62 | 20.35 | 14.75 | 6.20 |
| Compounding rate (wt %) | | | | | | | | | | |
| zirconyl phosphate B ($ZrO_2/P_2O_5 = 1.90$) | | 100 | 98 | 40 | 0 | 80 | 80 | 80 | 80 | 80 |
| zirconyl phosphate C ($ZrO_2/P_2O_5 = 2.00$) | | | | | | | | | | |
| zirconyl phosphate D ($ZrO_2/P_2O_5 = 1.70$) | 80 | | | | | | | | | |
| zirconyl phosphate E ($ZrO_2/P_2O_5 = 2.20$) | | | | | | | | | | |
| zirconyl phosphate A ($ZrO_2/P_2O_5 = 1.80$) | | | | | | | | | | |
| zircon ($ZrO_2/SiO_2 = 1.00$) | 20 | 0 | 2 | 60 | 100 | | | | | |
| MgO | | | | | | | | | 20 | |
| mullite | | | | | | 20 | | | | |
| $AlPO_4$ | | | | | | | 20 | | | |
| alumina | | | | | | | | 20 | | |
| spinel | | | | | | | | | 20 | |
| kaolin | | | | | | | | | | 20 |
| Firing conditions | | | | | | | | | | |
| firing temperature (°C.) | 1,450 | 1,600 | 1,400 | 1,500 | 1,600 | 1,600 | 1,600 | 1,600 | 1,600 | 1,600 |
| firing time (h) | 5 | 5 | 40 | 10 | 5 | 5 | 5 | 5 | 5 | 5 |
| Crystalline phase (wt %) | | | | | | | | | | |
| zirconyl phosphate | | 100 | 99 | 40 | — | — | s | — | m | m |
| zircon | | 0 | 1 | 60 | 100 | s | — | — | — | s |

TABLE 1(b)-continued

| | Comparative Example | | | | | | | | | |
|---|---|---|---|---|---|---|---|---|---|---|
| | 14 | 15 | 16 | 17 | 18 | 19 | 20 | 21 | 22 | 23 |
| m-$ZrO_2$ | | | | | | m | w | s | s | m |
| $AlPO_4$ | | | | | | m | m | m | w | — |
| Physical properties of sintered body | | | | | | | | | | |
| CTE ($\times 10^{-7}/°C$, 40~1400° C.) | 35 | 1 | 1.5 | 35 | 42 | 81 | | | | |
| 4-point flexural strength (kg/mm$^2$) | 2 | 1 | 2 | 14 | 20 | 3.6 | * | * | * | * |
| self-weight softening percentage (%, 1300° C. × 5 h) | 1.4 | — | — | — | 0.0 | — | | | | |
| open porosity (%) | 45 | 50 | 43 | 2 | 0 | 9 | | | | |
| melting point (°C.) | | | | | >1,650 | — | | | | |

*Grain growth was conspicuous and sample was broken during processing. s: strong, m: medium, w: weak

TABLE 2

| | MgO-stabilized $ZrO_2$ grinding media | $Y_2O_2$-stabilized $ZrO_2$ grinding media |
|---|---|---|
| $SiO_2$ | 0.28 | <0.05 |
| $Al_2O_3$ | 0.037 | <0.02 |
| $Fe_2O_3$ | 0.14 | 0.10 |
| $TiO_2$ | 0.12 | <0.01 |
| CaO | 0.29 | <0.005 |
| MgO | 3.37 | 0.007 |
| $K_2O$ | 0.010 | <0.005 |
| $Na_2O$ | 0.047 | <0.01 |
| $Y_2O_3$ | — | 5.04 |
| $ZrO_2$ | 94.19 | 92.90 |
| $HfO_2$ | 1.65 | 2.11 |
| Total | 100.13 | 100.16 |

In this case, it is necessary that with respect to the chemical composition, $ZrO_2$, $P_2O_5$, and $SiO_2$ are 61.3 to 65.4% by weight, 18.3 to 37.1% by weight, and 1.6 to 16.4% by weight, respectively. If $ZrO_2$ exceeds 65.4% by weight, m-$ZrO_2$ precipitates to result in high expansion, while if it is less than 61.3% by weight, $ZrP_2O_7$ precipitates to result in high expansion. Also, if $P_2O_5$ exceeds 37.1% by weight, $ZrP_2O_7$ precipitates to result in high expansion, while if it is less than 18.3% by weight, $ZrO_2$ precipitates to result in high expansion. If $SiO_2$ exceeds 16.4% by weight, an amount of zircon precipitated exceeds 50% by weight to result in high expansion, while if it is less than 1.6% by weight, the amount of zircon precipitated is less than 5% by weight, so that an effect of enhancing strength cannot fully be

TABLE 3

| | Chemical analysis value | | | | | | | | | | $ZrO_2/P_2O_3$ (mol/mol) | Average grain size (μm) |
|---|---|---|---|---|---|---|---|---|---|---|---|---|
| | $ZrO_2$ | $P_2O_5$ | $SiO_2$ | $Al_2O_3$ | MgO | CaO | NaKO | $Nb_2O_5$ | $Fe_2O_3$ | Ig. loss | | |
| zirconyl phosphate A | 50.93 | 32.58 | <0.2 | 0.03 | 0.18 | 0.21 | 0.05 | — | <0.01 | 14.30 | 1.80 | 0.8 |
| zirconyl phosphate C | 60.23 | 34.69 | <0.2 | 0.01 | 0.45 | 0.02 | 0.01 | — | <0.01 | 3.20 | 2.00 | 0.9 |
| zirconyl phosphate E | 62.67 | 32.81 | <0.2 | 0.02 | <0.01 | <0.01 | <0.01 | — | <0.01 | 4.65 | 2.20 | 1.0 |
| zirconyl phosphate B | 60.14 | 36.46 | <0.2 | <0.01 | 0.34 | <0.01 | 0.03 | — | <0.01 | 2.53 | 1.90 | 1.1 |
| zirconyl phosphate D | 52.33 | 35.51 | <0.2 | 0.14 | 0.51 | 0.19 | 0.04 | — | <0.01 | 11.42 | 1.70 | 1.2 |
| zirconyl phosphate F | 61.46 | 37.26 | <0.2 | 0.04 | 0.01 | <0.01 | 0.01 | — | <0.01 | 1.22 | 1.90 | 1.1 |
| zirconyl phosphate G | 60.18 | 36.48 | 0.4 | 0.05 | 0.07 | 0.07 | 0.64 | — | 0.05 | 2.06 | 1.90 | 1.7 |
| zircon | 66.04 | <0.01 | 32.19 | 0.54 | 0.11 | 0.13 | 0.07 | — | 0.24 | 0.39 | — | 1.0 |
| MgO | <0.01 | <0.01 | 0.20 | 0.044 | 94.52 | 0.45 | 0.004 | — | 0.032 | 4.12 | — | 1.0 |
| mullite | <0.01 | <0.01 | 26.94 | 70.62 | 0.18 | 0.30 | 0.47 | — | 0.84 | 0.12 | — | 5.0 |
| $AlPO_4$ | <0.01 | 55.60 | <0.01 | 41.86 | 0.01 | 0.01 | 0.03 | — | <0.01 | 2.60 | — | 2.0 |
| alumina | <0.01 | <0.01 | 0.013 | 99.17 | 0.002 | 0.002 | 0.342 | — | 0.015 | 0.08 | — | 4.0 |
| spinel | <0.01 | <0.01 | 0.005 | 71.67 | 26.47 | <0.001 | 0.004 | — | 0.013 | 0.94 | — | 1.0 |
| kaolin | <0.01 | <0.01 | 54.36 | 29.37 | 0.56 | 0.30 | 1.201 | — | 1.57 | 11.42 | — | 1.0 |
| cordierite | — | — | 55.90 | 28.06 | 13.53 | 0.23 | 0.81 | — | 1.35 | 0.12 | — | 1.9 |
| $Nb_2O_5$ | — | — | <0.01 | — | — | — | — | 99.9 | <0.01 | 0.1 | — | 0.8 |

Figure 2:
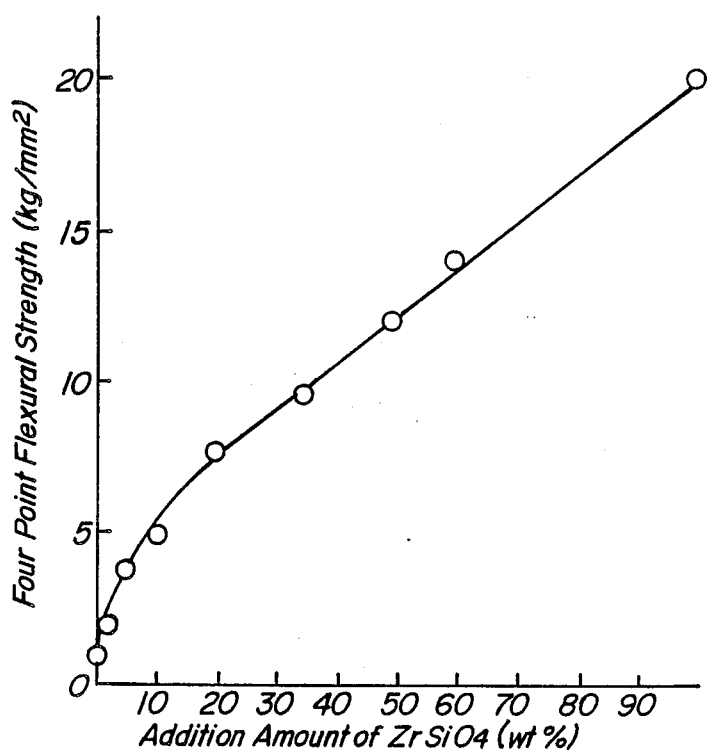
FIG. 2 is a diagram showing the dependency of the four point flexural strength of the zirconyl phosphate-zircon composite bodies upon the addition amount of zircon.

From results in Examples 1 to 7 and Comparative Examples 11 to 23 shown in Table 1, it is seen that the sintered bodies aimed at by the present invention in which the coefficient of thermal expansion in a temperature range from room temperature to 1,400° C. was not more than $30 \times 10^{-7}/°C$. and a melting point was not less than 1,600° C. could be obtained when $ZrO_2$, $P_2O_5$, and $SiO_2$ were contained 61.3 to 65.4% by weight, 18.3 to 37.1% by weight, and 1.6 to 16.4% by weight, respectively, and zirconyl phosphate and zircon were contained as a main crystalline phase and a secondary crystalline phase, respectively. Such sintered bodies could be obtained when a mixture in which 5 to 50% by weight of zircon was added to zirconyl phosphate and then sintered under firing conditions shown in Table 1.

obtained. The amount of precipitated zircon is preferably 5 to 35% by weight. In this case, the chemical composition is that $ZrO_2$ is 61.3 to 64.7% by weight, $P_2O_5$ is 23.7 to 37.1% by weight, and $SiO_2$ is from 1.6 to 11.5% by weight, and the coefficient of thermal expansion in a temperature range from room temperature to 1,400° C. is as low as not more than $20 \times 10^{-/}$°C. FIG. 1 shows relation between the addition amount of zircon and the coefficient of thermal expansion. FIG. 2 shows relation between the addition amount of zircon and the four point flexural strength.

Figure 3:
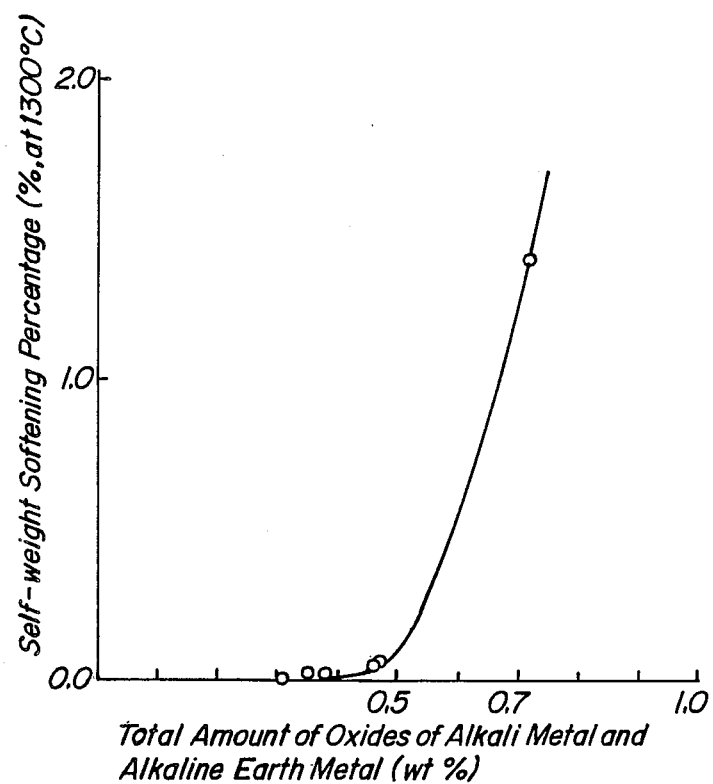
FIG. 3 is a diagram showing the relationship between the self-weight softening percentage at 1,300° C. of the zirconyl phosphate-zircon composite bodies and the total amount of oxides of an alkali metal and an alkaline earth metal.

Further, it is evident from FIG. 3 showing the relation between the self-weight softening percentage at 1,300° C. of the zirconyl phosphate-zircon composite sintered bodies and the total amount of oxides of an alkal metal and an alkaline earth metal that if the total amount of the oxides of the alkali metal and the alkaline earth metal exceed 0.5%, the self-weight softening percentage at 1,300° C. increases and the heat resistance lowers. In order to obtain the sintered bodies free from the above disadvantages, it is necessary that the total amount of the alkali metal and the alkaline earth metal contained in the zirconyl phosphate starting material and the zircon starting material is not more than 0.5% by weight.

Figure 4:
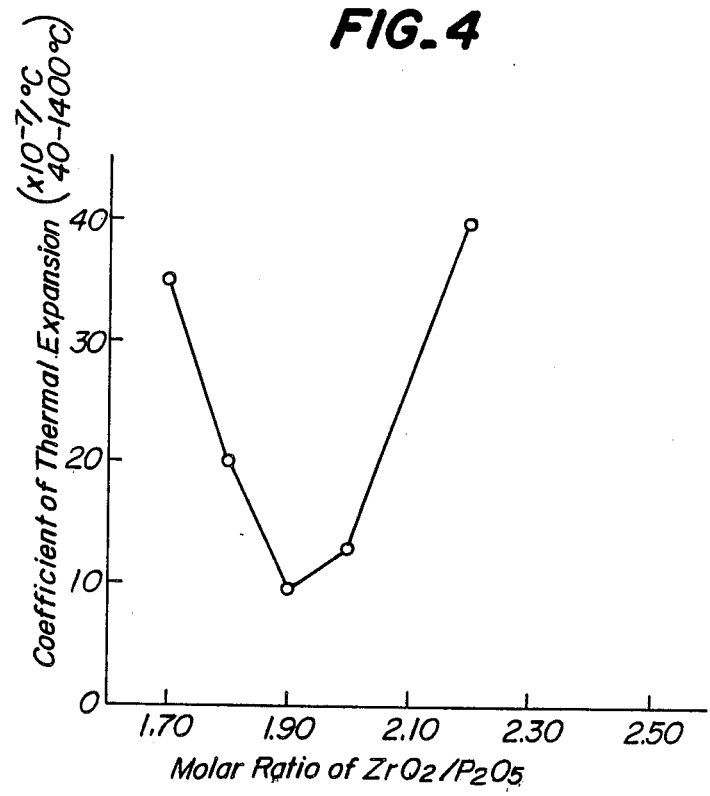
FIG. 4 is a diagram showing the relationship between the molar ratio of $ZrO_2/P_2O_5$ in a zirconyl phosphate starting material used for the production of the zirconyl phosphate-zircon composite bodies and the coefficient of thermal expansion of the zirconyl phosphate-zircon composite bodies.

It is also important to control the molar ratio between $ZrO_2$ and $P_2O_5$ in the zirconyl phosphate starting material in a range from 1.80 to 2.00. If it exceeds 2.00, the sintered bodies cannot be practically used, because monoclinic $ZrO_2$ precipitates to increase the coefficient of thermal expansion of the sintered body, and the sintered body undergoes serious damages due to rapid shrinkage caused by phase transformation of $ZrO_2$ from the monoclinic system to the tetragonal system and a rapid expansion caused by the phase transformation from the tetragonal phase to the monoclinic phase. On the other hand, if it is less than 1.80, an amount of a precipitated $(ZrO)_2P_2O_7$ phase is not sufficient, so that the coefficient of thermal expansion of the sintered body increases. Thus, the sintered body cannot be used as a low expansion material. FIG. 4 shows a relation between the molar ratio of $ZrO_2/P_2O_5$ and the coefficient of thermal expansion.

Figure 5:
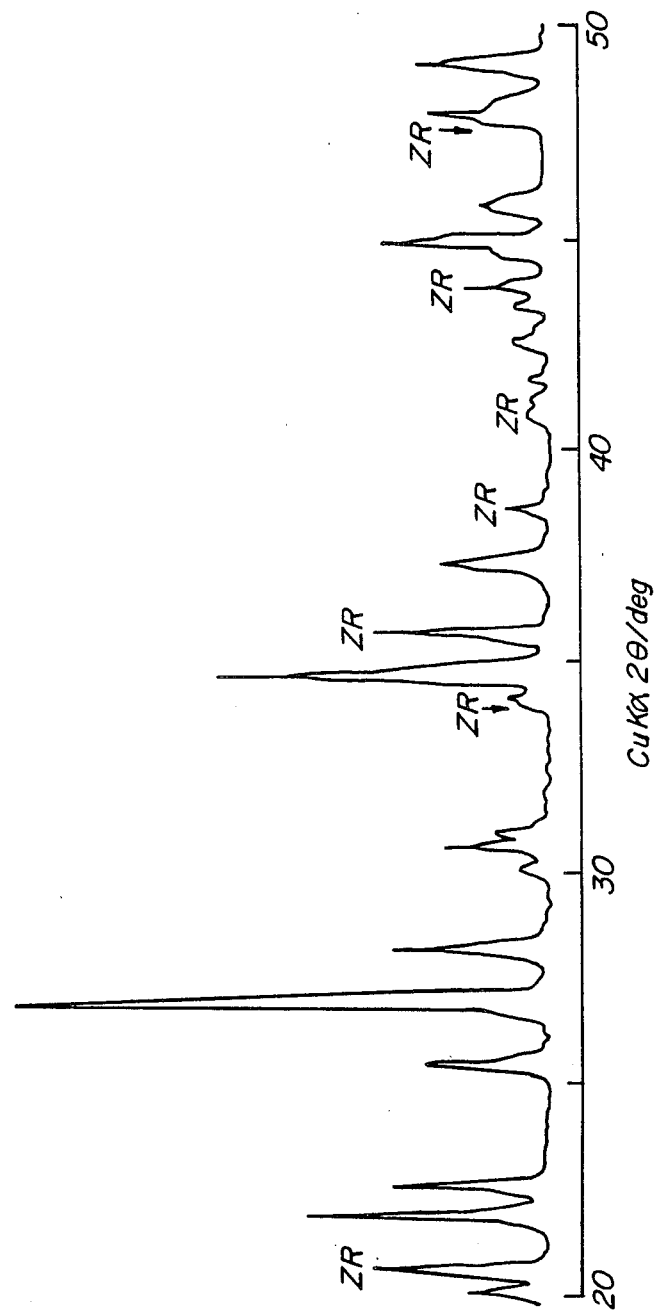
FIG. 5 is diagram showing an X ray diffraction pattern of a zirconyl phosphate-zircon composite body in Example 3 in which ZR denotes peaks of zircon.

FIG. 5 shows an X-ray diffraction pattern of a zirconyl phosphate-zircon composite body in Example 3. It is seen that a main component of the crystalline phase is zirconyl phosphate and the secondary crystalline phase is zircon ("ZR" denotes peak of zircon).

Figure 6:
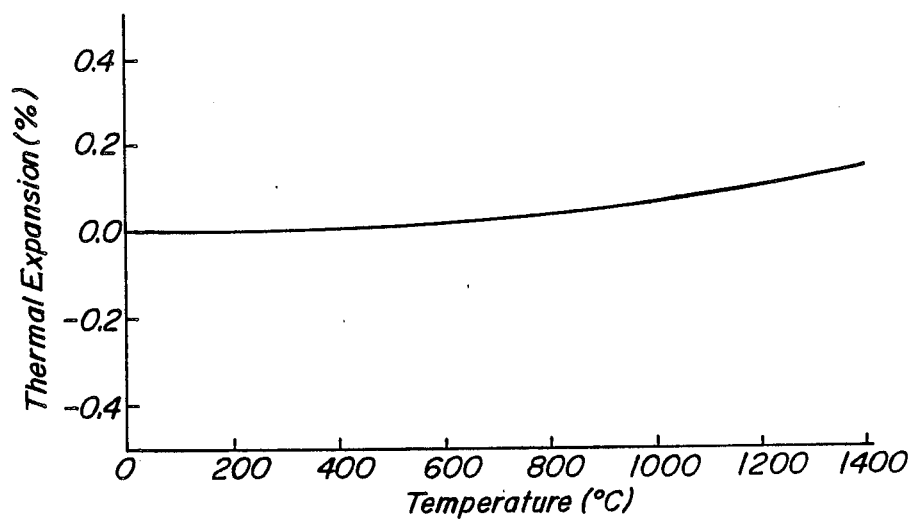
FIG. 6 is a diagram showing a thermal expansion curve of the zirconyl phosphate-zircon composite body in Example 3.

FIG. 6 is a thermal expansion curve of the zirconyl phosphate-zircon composite body in Example 3. It is seen that the sintered body did not soften in a temperature range from room temperature to 1,400° C.

Next, another aspect of the present invention will be explained with reference to the following examples.

Zirconyl phosphate, zircon, magnesia, mullite, aluminum phosphate, alumina, spinel, kaolin and cordierite which had preliminarily been adjusted in grain size were mixed according to a compounding recipe shown in Table 4. The zirconyl phosphate was adjusted in grain size by using a vibration mill, a pot mill or an attritor mill which was filled with 5 mm diameter $ZrO_2$ sintered grinding media. $ZrO_2$ sintered grinding media stabilized with MgO or $Y_2O_3$ was used. As in the case of the aforementioned Examples, the chemical compositions of the grinding media used are shown in Table 2. Chemical analysis values of the starting materials used are shown in Table 3.

5 parts by weight of a 10% PVA aqueous solution was added to 100 parts by weight of a formulated mixture shown in Table 4, which were sufficiently mixed, press molded at a pressure of 100 kg/cm² by using a mold of 25×80×6 mm, and rubber pressed at a pressure of 2 ton/cm², followed by drying. The thus dried molding was fired in air in an electric furnace under conditions shown in Table 4. A temperature elevating speed was 5°C./h to 1,700° C. After the firing the thus sintered body was machined in the form of a 3×4×40 mm flexural strength test piece such as shown in JIS R 1601 (1981). In the same manners as in the aforementioned Examples, the coefficient of thermal expansion in a temperature range from room temperature to 1,400° C., the four point flexural strength, self-weight softening percentage, the open porosity, and the melting point of the test were measured.

TABLE 4(a)

| | Example | | | | | | | | |
|---|---|---|---|---|---|---|---|---|---|
| | 31 | 32 | 33 | 34 | 35 | 36 | 37 | 38 | 39 |
| Chemical composition (wt %) | | | | | | | | | |
| $ZrO_2$ | 62.32 | 62.54 | 62.98 | 63.60 | 64.27 | 63.26 | 61.20 | 62.60 | 59.69 |
| $P_2O_5$ | 35.76 | 33.87 | 30.10 | 24.82 | 19.17 | 32.48 | 34.22 | 33.91 | 32.33 |
| $SiO_2$ | 1.74 | 3.36 | 6.61 | 11.16 | 16.03 | 3.46 | 3.89 | 3.31 | 5.80 |
| MgO | 0.04 | 0.05 | 0.06 | 0.07 | 0.09 | 0.45 | 0.23 | 0.03 | 0.67 |
| CaO | 0.01 | 0.01 | 0.03 | 0.05 | 0.06 | 0.03 | 0.24 | 0.01 | 0.02 |
| NaKO | 0.01 | 0.02 | 0.02 | 0.03 | 0.04 | 0.12 | 0.06 | 0.02 | 0.05 |
| $Al_2O_3$ | 0.12 | 0.15 | 0.20 | 0.27 | 0.34 | 0.18 | 0.16 | 0.12 | 1.44 |
| Compounding rate (wt %) | | | | | | | | | |
| zirconyl phosphate F ($ZrO_2/P_2O_5$ = 1.90) | 95 | 90 | 80 | 66 | 51 | | | 90 | 90 |
| zirconyl phosphate C ($ZrO_2/P_2O_5$ = 2.00) | | | | | | 90 | | | |
| zirconyl phosphate D ($ZrO_2/P_2O_5$ = 1.70) | | | | | | | | | |
| zirconyl phosphate E ($ZrO_2/P_2O_5$ = 2.20) | | | | | | | | | |
| zirconyl phosphate A ($ZrO_2/P_2O_5$ = 1.80) | | | | | | | 90 | | |
| zirconyl phosphate B ($ZrO_2/P_2O_5$ = 1.90) | | | | | | | | | |
| zirconyl phosphate G ($ZrO_2/P_2O_5$ = 1.90) | | | | | | | | | |
| zircon ($ZrO_2/SiO_2$ = 1.00) | 5 | 10 | 20 | 34 | 49 | 10 | 10 | 10 | 10 |
| MgO | | | | | | | | | |
| mullite | | | | | | | | | |
| $AlPO_4$ | | | | | | | | | |
| alumina | | | | | | | | | |
| spinel | | | | | | | | | |
| kaolin | | | | | | | | | |
| cordierite | 0.2 | 0.2 | 0.2 | 0.2 | 0.2 | 0.2 | 0.2 | 0.1 | 5 |
| Firing conditions | | | | | | | | | |
| firing temperature (°C.) | 1,600 | 1,600 | 1,600 | 1,550 | 1,400 | 1,650 | 1,600 | 1,600 | 1,550 |
| firing time (h) | 5 | 5 | 5 | 10 | 20 | 3 | 5 | 5 | 5 |
| Crystalline phase (wt %) | | | | | | | | | |
| zirconyl phosphate | 95 | 90 | 80 | 66 | 51 | 90 | 90 | 90 | 90 |
| zircon | 5 | 10 | 20 | 31 | 49 | 10 | 10 | 10 | 10 |
| m-$ZrO_2$ | | | | | | | | | |
| $AlPO_4$ | | | | | | | | | |
| Physical properties of sintered body | | | | | | | | | |

TABLE 4(a)-continued

| | Example | | | | | | | | |
|---|---|---|---|---|---|---|---|---|---|
| | 31 | 32 | 33 | 34 | 35 | 36 | 37 | 38 | 39 |
| CTE ($\times 10^{-7}$/°C., 40~1400° C.) | 1.5 | 4.8 | 9.6 | 19.3 | 29.0 | 5.6 | 12.5 | | |
| 4-point flexural strength (kg/mm$^2$) | 3.8 | 5.3 | 8.4 | 11.7 | 14.3 | 4.9 | 5.0 | | |
| self-weight softening percentage (%, 1300° C. × 5 h) | 0.00 | 0.00 | 0.00 | 0.01 | 0.01 | 0.07 | 0.05 | 0.00 | 0.08 |
| open porosity (%) | | 8 | 4 | 1 | 1 | | | | |
| melting point (°C.) | >1,650 | >1,650 | >1,650 | >1,650 | >1,650 | >1,650 | >1,650 | | |

TABLE 4(b)

| | Comparative Example | | | | | | |
|---|---|---|---|---|---|---|---|
| | 40 | 41 | 42 | 43 | 44 | 45 | 46 |
| Chemical composition (wt %) | | | | | | | |
| ZrO$_2$ | 62.00 | 62.35 | 56.98 | 65.60 | 59.70 | 62.02 | 62.18 |
| P$_2$O$_5$ | 33.50 | 29.65 | 30.86 | 30.74 | 35.53 | 37.60 | 36.88 |
| SiO$_2$ | 3.65 | 6.55 | 8.11 | 3.47 | 3.70 | 0.00 | 0.76 |
| MgO | 0.08 | 1.27 | 1.26 | 0.13 | 0.55 | 0.35 | 0.04 |
| CaO | 0.08 | 0.03 | 0.33 | 0.04 | 0.21 | 0.00 | 0.00 |
| NaKO | 0.59 | 0.04 | 0.09 | 0.01 | 0.05 | 0.03 | 0.01 |
| Al$_2$O$_3$ | 0.10 | | 2.67 | 0.01 | 0.26 | 0.00 | 0.10 |
| Compounding rate (wt %) | | | | | | | |
| zirconyl phosphate F (ZrO$_2$/P$_2$O$_5$ = 1.90) | | | | | | 100 | 98 |
| zirconyl phosphate C (ZrO$_2$/P$_2$O$_5$ = 2.00) | | | | | | | |
| zirconyl phosphate D (ZrO$_2$/P$_2$O$_5$ = 1.70) | | | | 90 | 90 | | |
| zirconyl phosphate E (ZrO$_2$/P$_2$O$_5$ = 2.20) | | | | | | | |
| zirconyl phosphate A (ZrO$_2$/P$_2$O$_5$ = 1.80) | | | | | | | |
| zirconyl phosphate B (ZrO$_2$/P$_2$O$_5$ = 1.90) | | 79.2 | 90 | | | | |
| zirconyl phosphate G (ZrO$_2$/P$_2$O$_5$ = 1.90) | 90 | | | | | | |
| zircon (ZrO$_2$/SiO$_2$ = 1.00) | 10 | 19.8 | 10 | 10 | 10 | 0 | 2 |
| MgO | | 1 | | | | | |
| mullite | | | | | | | |
| AlPO$_4$ | | | | | | | |
| alumina | | | | | | | |
| spinel | | | | | | | |
| kaolin | | | | | | | |
| cordierite | | | 10 | 0.2 | 0.2 | | 0.2 |
| Firing conditions | | | | | | | |
| firing temperature (°C.) | 1,500 | 1,600 | 1,450 | 1,500 | 1,450 | 1,600 | 1,400 |
| firing time (h) | 5 | 5 | 10 | 10 | 10 | 5 | 40 |
| Crystalline phase (wt %) | | | | | | | |
| zirconyl phosphate | 90 | 80 | 85 | | | 100 | 99 |
| zircon | 10 | 20 | 15 | | | 0 | 1 |
| m-ZrO$_2$ | | | | w | | | |
| AlPO$_4$ | | | | | | | |
| Physical properties of sintered body | | | | | | | |
| CTE ($\times 10^{-7}$/°C., 40~1400° C.) | | | 5.5 | 18 | 22 | 1 | 1.3 |
| 4-point flexural strength (kg/mm$^2$) | | | 7.0 | 2.0 | 1.8 | 1 | 3.1 |
| self-weight softening percentage (%, 1300° C. × 5 h) | 1.7 | * | 2.0 | | 0.09 | — | — |
| open porosity (%) | | | 2 | | 36 | 50 | 43 |
| melting point (°C.) | | | — | | | >1,650 | |

TABLE 4(c)

| | Comparative Example | | | | | | |
|---|---|---|---|---|---|---|---|
| | 47 | 48 | 49 | 50 | 51 | 52 | 53 |
| Chemical composition (wt %) | | | | | | | |
| ZrO$_2$ | 64.75 | 66.65 | 49.46 | 49.56 | 49.35 | 49.49 | 50.79 |
| P$_2$O$_5$ | 15.03 | 0.00 | 29.98 | 41.50 | 29.92 | 30.01 | 30.79 |
| SiO$_2$ | 19.59 | 32.49 | 5.54 | 0.00 | 0.00 | 0.00 | 11.48 |
| MgO | 0.10 | 0.11 | 0.32 | 0.28 | 0.27 | 5.73 | 0.40 |
| CaO | 0.08 | 0.13 | 0.06 | 0.00 | 0.01 | 0.00 | 0.06 |
| NaKO | 0.04 | 0.07 | 0.12 | 0.02 | 0.09 | 0.02 | 0.28 |
| Al$_2$O$_3$ | 0.40 | 0.55 | 14.52 | 8.62 | 20.35 | 14.75 | 6.20 |
| Compounding rate (wt %) | | | | | | | |
| zirconyl phosphate F (ZrO$_2$/P$_2$O$_5$ = 1.90) | 40 | 0 | | | | | |
| zirconyl phosphate C (ZrO$_2$/P$_2$O$_5$ = 2.00) | | | | | | | |
| zirconyl phosphate D (ZrO$_2$/P$_2$O$_5$ = 1.70) | | | | | | | |
| zirconyl phosphate E (ZrO$_2$/P$_2$O$_5$ = 2.20) | | | 80 | 80 | 80 | 80 | 80 |
| zirconyl phosphate A (ZrO$_2$/P$_2$O$_5$ = 1.80) | | | | | | | |
| zirconyl phosphate B (ZrO$_2$/P$_2$O$_5$ = 1.90) | | | | | | | |
| zirconyl phosphate G (ZrO$_2$/P$_2$O$_5$ = 1.90) | | | | | | | |
| zircon (ZrO$_2$/SiO$_2$ = 1.00) | 60 | 100 | | | | | |
| MgO | | | | | | | |
| mullite | | | 20 | | | | |
| AlPO$_4$ | | | | 20 | | | |
| alumina | | | | | 20 | | |

TABLE 4(c)-continued

|  | Comparative Example | | | | | | |
|---|---|---|---|---|---|---|---|
|  | 47 | 48 | 49 | 50 | 51 | 52 | 53 |
| spinel |  |  |  |  |  | 20 |  |
| kaolin |  |  |  |  |  |  | 20 |
| cordierite | 0.2 |  |  |  |  |  |  |
| Firing conditions |  |  |  |  |  |  |  |
| firing temperature (°C.) | 1,500 | 1,600 | 1,600 | 1,600 | 1,600 | 1,600 | 1,600 |
| firing time (h) | 10 | 5 | 5 | 5 | 5 | 5 | 5 |
| Crystalline phase (wt %) |  |  |  |  |  |  |  |
| zirconyl phosphate | 40 | — | — | s | — | m | m |
| zircon | 60 | 100 | s | — | — | — | s |
| m-$ZrO_2$ |  |  | m | w | s | s | m |
| $AlPO_4$ |  |  | m | m | m | w | — |
| Physical properties of sintered body |  |  |  |  |  |  |  |
| CTE ($\times 10^{-7}$/°C., 40~1400° C.) | 33 | 42 | 81 |  |  |  |  |
| 4-point flexural strength (kg/mm$^2$) | 16.2 | 20 | 3.6 |  |  |  |  |
| self-weight softening percentage (%, 1300° C. $\times$ 5 h) | — | 0.0 | — | * | * | * | * |
| open porosity (%) | 2 | 0 | 9 |  |  |  |  |
| melting point (°C.) |  | >1,650 | — |  |  |  |  |

Figure 8:
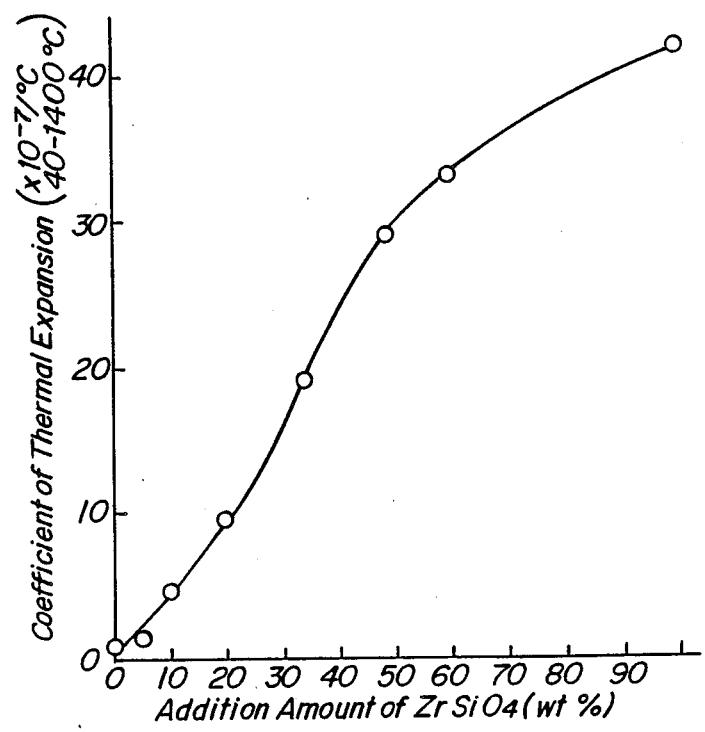
FIG. 8 is a diagram showing the dependency of the coefficient of thermal expansion of zirconyl phosphate-zircon composite bodies according to the fourth aspect of the present invention upon an addition amount of zircon.
Figure 9:
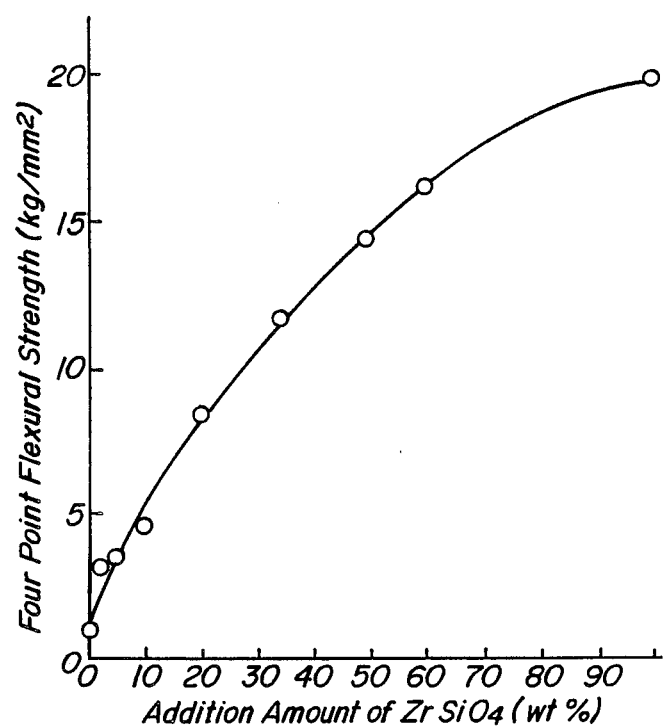
FIG. 9 is a diagram showing the dependency of the four point flexural strength of the zirconyl phosphate-zircon composite bodies upon an addition amount of zircon.

*Grain growth was conspicuous and sample was broken during processing. s: strong, m: medium, w: weak From results of Examples 31 to 39 and Comparative Examples 40 to 53 shown in Table 4, the sintered bodies aimed at by the present invention in which the coefficient of thermal expansion in a temperature range from room temperature to 1,400° C. was not more than $25 \times 10^{-7}$/°C. and a melting point was not less than 1,600° C. could be obtained when the sintered body consisted of 58.2 to 65.3% by weight of $ZrO_2$, 17.4 to 37.1% by weight of $P_2O_5$, 1.6 to 19.0% by weight of $SiO_2$, and the balance being MgO and $Al_2O_3$ in a total amount of not more than 2.5% by weight, and contained zirconyl phosphate and zircon as a main crystalline phase and a secondary crystalline phase, respectively. Such sintered bodies could be obtained by sintering a formulated mixture in which 0.1 to 5 parts by weight of cordierite was added to 100 parts by weight of a batch mixture in which 5 to 50% by weight of zircon was added to zirconyl phosphate under firing conditions shown in Table 4. It is necessary that with respect to the chemical composition, $ZrO_2$, $P_2O_5$, $SiO_2$, and MgO+$Al_2O_3$ are 58.2 to 65.3% by weight, 17.4 to 37.1% by weight, 1.6 to 19.0% by weight, and not more than 2.5% by weight, respectively. If $ZrO_2$ exceeds 65.3% by weight, m-$ZrO_2$ precipitates to result in high expansion, while if it is less than 58.2% by weight, $ZrP_2O_7$ precipitates to result in high expansion. Also, if $P_2O_5$ is more than 37.1% by weight, $ZrP_2O_7$ precipitates to result in high expansion, while if it is less than 17.4% by weight, m-$ZrO_2$ precipitates to result in high expansion. If $SiO_2$ exceeds 19.0% by weight, an amount of zircon precipitated exceeds 50% by weight to result in high expansion, while if it is less than 1.6% by weight, the amount of precipitated zircon is less than 5% by weight, so that an effect of improving strength cannot fully be obtained. If a total amount of MgO+$Al_2O_3$ is over 2.5% by weight, heat resistance of the sintered body lowers and abnormal grain growth occurs to lower strength. The amount of precipitated zircon is particularly desirably 5 to 35% by weight. In this case, the chemical composition is that $ZrO_2$, $P_2O_5$, $SiO_2$, and MgO+$Al_2O_3$ are 58.2 to 64.7% by weight, 22.5 to 37.1% by weight, 1.6 to 14.1% by weight, and not more than 2.5% by weight, respectively, and the coefficient of thermal expansion in a temperature range from room temperature to 1,400° C. is as low as not more than $20 \times 10^{-7}$/°C. FIG. 8 shows relation between the addition amount of zircon and the coefficient of thermal expansion, and FIG. 9 shows the relation between the addition amount of zircon and the four point flexural strength.

Figure 10:
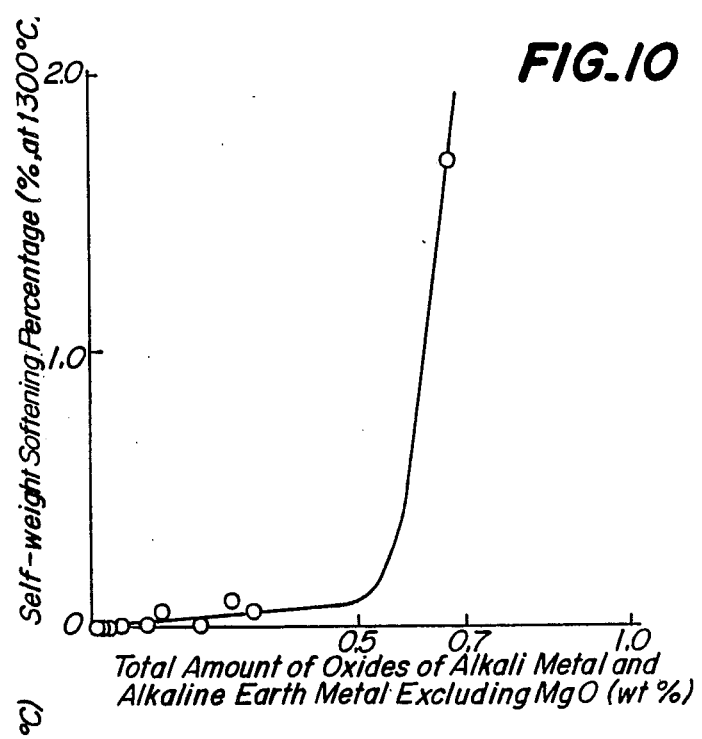
FIG. 10 is a diagram showing the relationship between the self-weight softening percentage at 1,300° C. of the zirconyl phosphate-zircon composite bodies and the total amount of oxides of an alkali metal and an alkaline earth metal excluding MgO.
Figure 11:
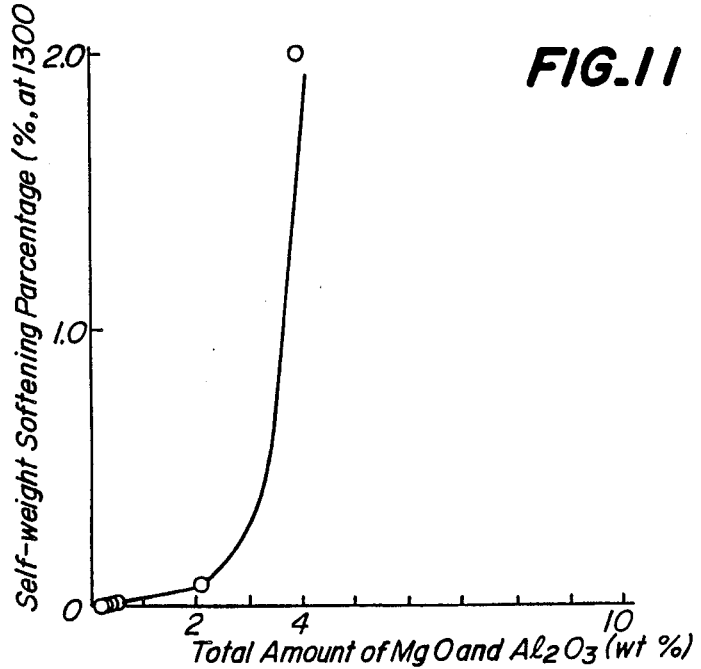
FIG. 11 is a diagram showing the relationship between the self-weight softening percentage at 1,300° C. of an zirconyl phosphate-zircon composite bodies and the addition amount of cordierite.

Moreover, as obvious from FIG. 10 showing the relation between the self-weight softening percentage at 1,300° C. and the total amount of oxides of an alkali metal and an alkaline earth metal excluding MgO in the zirconyl phosphate-zircon composite sintered bodies and FIG. 11 showing relation between the self-weight softening percentage and the total amount of MgO and $Al_2O_3$, if the total amount of the oxides of the alkali metal and the alkaline earth metal in the sintered body excluding MgO exceeds 0.5% by weight or the total amount of MgO and $Al_2O_3$ exceeds 2.5% by weight, the self-weight softening percentage at 1,300° C. increases and the heat resistance lowers. In order to obtain the sintered bodies according to the present invention, it is necessary that the total amount of the oxides of the alkali metal and the alkaline earth metal contained in each of the zirconyl phosphate starting material and the zircon starting material is not more than 0.5% by weight and the total amount of the oxides of the alkali metal and the alkaline earth metal in the cordierite starting material excluding MgO is not more than 1% by weight.

Figure 12:
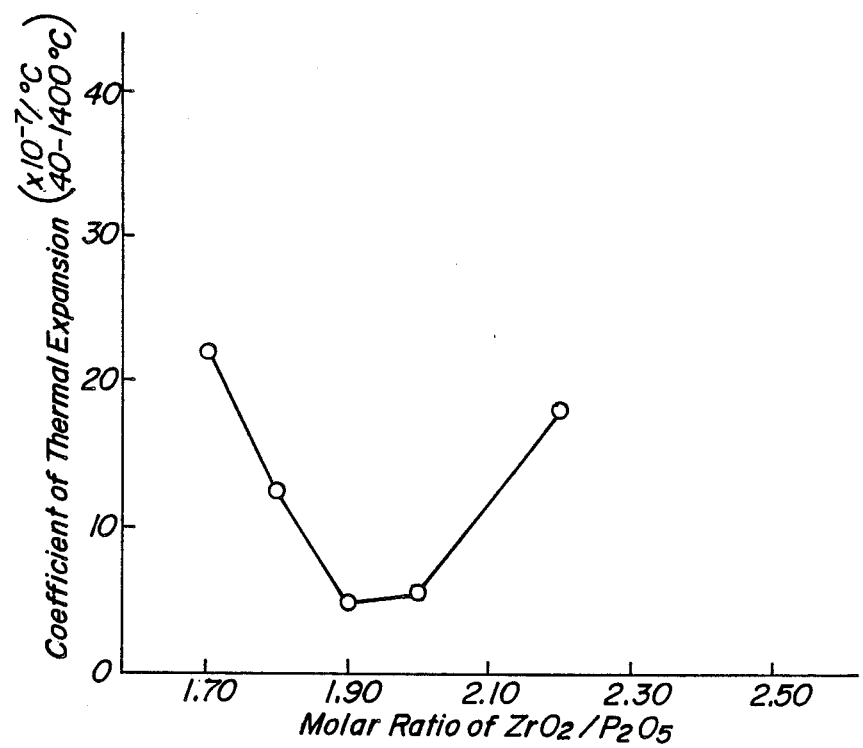
FIG. 12 is a diagram showing the relationship between the molar ratio of $ZrO_2/P_2O_5$ in zirconyl phosphate starting materials used for producing the zirconyl phosphate-zircon composite bodies and the coefficient of thermal expansion of the zirconyl phosphate-zircon composite body.

It is also important to control the molar ratio between $ZrO_2$ and $P_2O_5$ in the zirconyl phosphate starting material in a range from 1.80 to 2.00. If this molar ratio exceeds 2.00, the sintered bodies undergo serious damages because of increased coefficient of thermal expansion of the sintered bodies due to the precipitation of monoclinic $ZrO_2$, rapid shrinkage due to the phase transformation of $ZrO_2$ from the monoclinic system to the tetragonal system and rapid expansion due to the phase transformation from the tetragonal system to the monoclinic system. Thus, the sintered bodies cannot be practically used. If it is less than 1.80, the coefficient of thermal expansion of the sintered body increases because a sufficient of $(ZrO)_2P_2O_7$ phase is not precipitated. Thus, the obtained sintered bodies cannot be practically used as low expansion materials. FIG. 12 shows relation between the molar ratio of $ZrO_2/P_2O_5$ and the coefficient of thermal expansion.

Figure 13:
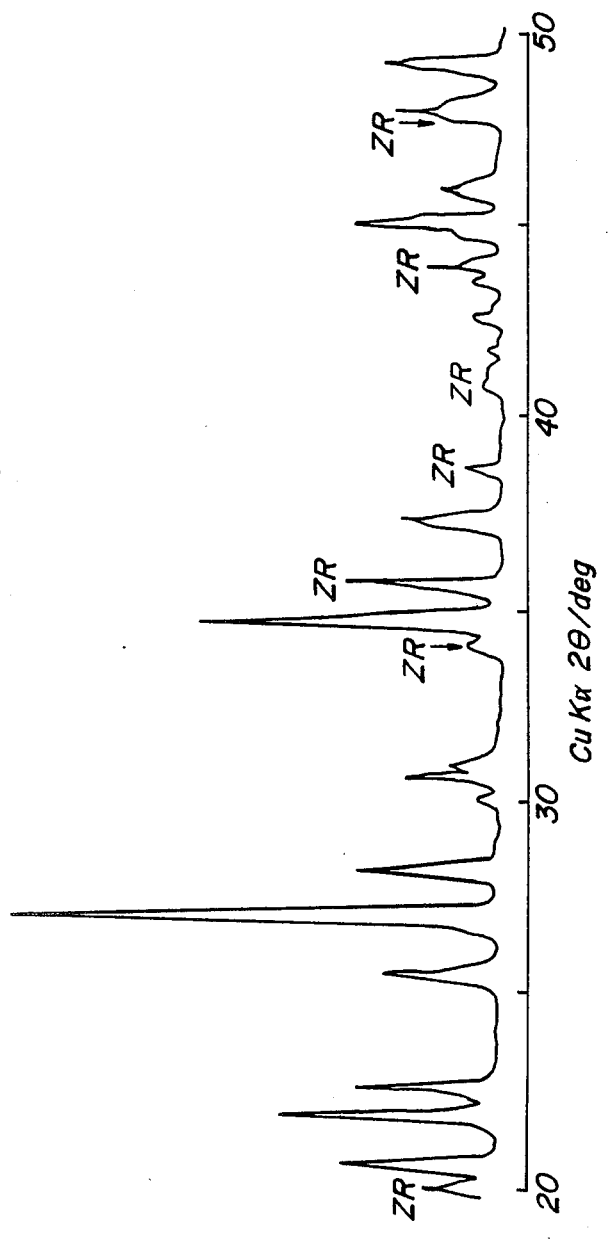
FIG. 13 is a diagram showing an X ray diffraction pattern of a zirconyl phosphate-zircon composite body in Example 33 in which ZR denotes peaks of zircon.

FIG. 13 shows an X-ray diffraction pattern of the zirconyl phosphate-zircon complex sintered body of Example 33. It is seen that a main component of the crystalline phase is zirconyl phosphate and a secondary crystalline phase is zircon ("ZR" denotes peaks of zircon).

Figure 14:
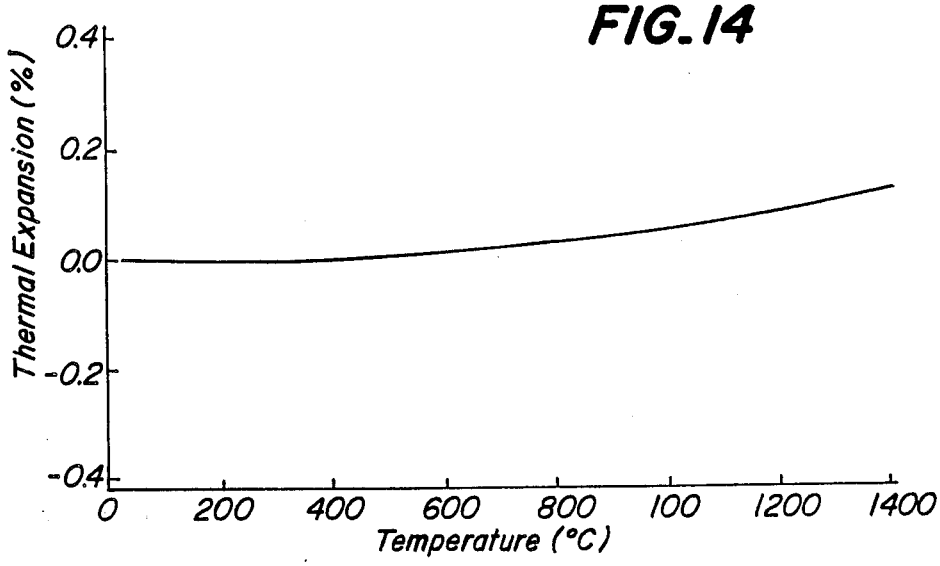
FIG. 14 is a diagram showing a thermal expansion curve of the zirconyl phosphate-zircon composite body in Example 33.

FIG. 14 shows a thermal expansion curve of the zirconyl phosphate-zircon complex sintered body of Example 33. It is seen that the sintered body did not soften at a temperature range from room temperature to 1,400° C.

Next, the third aspect of the present invention will be explained with reference to the following examples. They are merely given in illustration of the invention, but should never be interpreted to limit the scope thereof.

Zirconyl phosphate, zircon, magnesia, mullite, aluminum phosphate, alumina, spinel, kaolin, and $Nb_2O_5$ which had been adjusted in grain size were mixed according to a compounding recipe shown in Table 5. The grain size of the zirconyl phosphate was adjusted by using a vibration mill, a pot mill, or an attritor mill which was filled with 5 mm diameter $ZrO_2$ sintered grinding media, as the $ZrO_2$ sintered grinding media $ZrO_2$ stabilized with MgO or $Y_2O_3$ was used. The chemical composition of the grinding media used was shown in Table 2 as in the same as in the above Examples. Table 3 shows chemical analysis values of the starting materials used.

5 parts by weight of a 10% PVA aqueous solution was added to 100 parts by weight of a formulated mixture shown in Table 5, which were fully mixed, press molded at a pressure of 100 kg/cm² by using aa mold of 25×80×6 mm, and rubber pressed at a pressure of 2 ton/cm², followed by drying. The thus dried molding was fired in air in an electric furnace under conditions shown in Table 5. A temperature elevating speed was in a range from 5°C/h to 1,700° C./h. After the firing, the sintered body was machined in the form of a 3×4×40 mm flexural strength test piece shown in JIS R 1601 (1981), and in the same manners as in the aforementioned examples, the coefficient of thermal expansion the four point flexural strength the, self-weight softening percentage, the open porosity, and the melting point of the test pieces were measured. The coefficient of thermal expansion was measured by using a push rod indicating type thermal expansion meter employing a high purity alumina sintered body.

TABLE 5(a)

| | Example | | | | | | | | Comparative Example | |
|---|---|---|---|---|---|---|---|---|---|---|
| | 61 | 62 | 63 | 64 | 65 | 66 | 67 | 68 | 70 | 71 |
| Chemical composition (wt %) | | | | | | | | | | |
| $ZrO_2$ | 62.13 | 62.36 | 62.83 | 63.49 | 64.19 | 63.72 | 61.90 | 60.54 | 57.24 | 62.35 |
| $P_2O_5$ | 35.61 | 33.70 | 29.89 | 24.58 | 18.93 | 28.81 | 29.90 | 28.80 | 27.23 | 29.65 |
| $SiO_2$ | 1.66 | 3.30 | 6.60 | 11.18 | 16.06 | 6.69 | 7.39 | 6.36 | 6.01 | 6.55 |
| MgO | 0.34 | 0.33 | 0.30 | 0.27 | 0.23 | 0.40 | 0.19 | 0.29 | 0.27 | 1.27 |
| CaO | 0.01 | 0.01 | 0.03 | 0.05 | 0.07 | 0.04 | 0.22 | 0.03 | 0.03 | 0.03 |
| NaKO | 0.03 | 0.03 | 0.04 | 0.04 | 0.05 | 0.02 | 0.06 | 0.04 | 0.04 | 0.04 |
| $Al_2O_3$ | 0.03 | 0.06 | 0.11 | 0.19 | 0.27 | 0.12 | 0.15 | 0.11 | 0.10 | 0.11 |
| $Nb_2O_5$ | 0.19 | 0.21 | 0.20 | 0.20 | 0.20 | 0.20 | 0.19 | 3.83 | 9.08 | |
| Compounding rate (wt %) | | | | | | | | | | |
| zirconyl phosphate B ($ZrO_2/P_2O_5$ = 1.90) | 95 | 90 | 80 | 66 | 51 | | | 80 | 80 | 79.2 |
| zirconyl phosphate C ($ZrO_2/P_2O_5$ = 2.00) | | | | | | 80 | | | | |
| zirconyl phosphate D ($ZrO_2/P_2O_5$ = 1.70) | | | | | | | | | | |
| zirconyl phosphate E ($ZrO_2/P_2O_5$ = 2.20) | | | | | | | | 80 | | |
| zirconyl phosphate A ($ZrO_2/P_2O_5$ = 1.80) | | | | | | | 80 | | | 19.8 |
| zircon ($ZrO_2/SiO_2$ = 1.00) | 5 | 10 | 20 | 34 | 49 | 20 | 20 | 20 | 20 | 1 |
| MgO | | | | | | | | | | |
| mullite | | | | | | | | | | |
| $AlPO_4$ | | | | | | | | | | |
| alumina | | | | | | | | | | |
| spinel | | | | | | | | | | |
| kaolin | | | | | | | | | | |
| $N_2b_5$ | 0.2 | 0.2 | 0.2 | 0.2 | 0.2 | 0.2 | 0.2 | 4 | 10 | |
| Firing conditions | | | | | | | | | | |
| firing temperature (°C.) | 1,600 | 1,600 | 1,600 | 1,550 | 1,400 | 1,650 | 1,600 | 1,600 | 1,450 | 1,600 |
| firing time (h) | 5 | 5 | 5 | 10 | 20 | 3 | 5 | 5 | 5 | 5 |
| Crystalline phase (wt %) | | | | | | | | | | |
| zirconyl phosphate | 95 | 90 | 80 | 66 | 51 | 80 | 80 | 80 | 80 | 80 |
| zircon | 5 | 10 | 20 | 34 | 49 | 20 | 20 | 20 | 20 | 20 |
| m-$ZrO_2$ | | | | | | | | | | |
| $AlPO_4$ | | | | | | | | | | |
| Physical properties of sintered body | | | | | | | | | | |
| CTE ($\times 10^{-7}$/°C., 40~1400° C.) | 1.5 | 4.0 | 8.9 | 19 | 28 | 12 | 19 | 8.5 | — | |
| 4-point flexural strength (kg/mm²) | 43 | 58 | 80 | 98 | 12 | 5 | 5 | 82 | | |
| self-weight softening percentage (%, 1300° C. × 5 h) | 0.02 | 0.01 | 0.02 | 0.00 | 0.02 | 0.05 | 0.06 | 0.08 | 79 | * |
| open porosity (%) | 25 | 17 | 7 | 3 | 2 | 17 | 20 | 6 | 1.0 | |
| melting point (°C.) | >1,650 | >1,650 | >1,650 | >1,650 | >1,650 | >1,650 | >1,650 | >1,650 | | |

TABLE 5(b)

| | Comparative Example | | | | | | | | | | | |
|---|---|---|---|---|---|---|---|---|---|---|---|---|
| | 72 | 73 | 74 | 75 | 76 | 77 | 78 | 79 | 80 | 81 | 82 | 83 |
| Chemical composition (wt %) | | | | | | | | | | | | |
| $ZrO_2$ | 61.73 | 65.71 | 60.54 | 62.02 | 61.99 | 64.69 | 66.65 | 49.46 | 49.56 | 49.35 | 49.49 | 50.79 |
| $P_2O_5$ | 29.36 | 27.23 | 31.23 | 37.60 | 36.76 | 14.82 | 0.00 | 29.98 | 41.50 | 29.92 | 30.01 | 30.79 |
| $SiO_2$ | 6.48 | 6.68 | 7.08 | 0.00 | 0.67 | 19.62 | 32.49 | 5.54 | 0.00 | 0.00 | 0.00 | 11.48 |
| MgO | 2.24 | 0.02 | 0.47 | 0.35 | 0.35 | 0.21 | 0.11 | 0.32 | 0.28 | 0.28 | 5.73 | 0.40 |

TABLE 5(b)-continued

| | Comparative Example | | | | | | | | | | | |
|---|---|---|---|---|---|---|---|---|---|---|---|---|
| | 72 | 73 | 74 | 75 | 76 | 77 | 78 | 79 | 80 | 81 | 82 | 83 |
| CaO | 0.04 | 0.03 | 0.20 | 0.00 | 0.00 | 0.08 | 0.13 | 0.06 | 0.00 | 0.01 | 0.00 | 0.06 |
| NaKO | 0.04 | 0.01 | 0.05 | 0.03 | 0.03 | 0.05 | 0.07 | 0.12 | 0.02 | 0.09 | 0.02 | 0. |
| $Al_2O_3$ | 0.11 | 0.13 | 0.24 | 0.00 | 0.01 | 0.33 | 0.55 | 14.52 | 8.62 | 20.35 | 14.75 | 6.2 |
| $Nb_2O_5$ | | 0.19 | 0.19 | | 0.19 | 0.20 | | | | | | |
| Compounding rate (wt %) | | | | | | | | | | | | |
| zirconyl phosphate B ($ZrO_2/P_2O_5$ = 1.90) | 78.4 | | | 100 | 98 | 40 | 0 | 80 | 80 | 80 | 80 | 80 |
| zirconyl phosphate C ($ZrO_2/P_2O_5$ = 2.00) | | | | | | | | | | | | |
| zirconyl phosphate D ($ZrO_2/P_2O_5$ = 1.70) | | | 80 | | | | | | | | | |
| zirconyl phosphate E ($ZrO_2/P_2O_5$ = 2.20) | | 80 | | | | | | | | | | |
| zirconyl phosphate A ($ZrO_2/P_2O_5$ = 1.80) | | | | | | | | | | | | |
| zircon ($ZrO_2/SiO_2$ = 1.00) | 19.6 | 20 | 20 | 0 | 2 | 60 | 100 | | | | | |
| MgO | 2 | | | | | | | | | | | |
| mullite | | | | | | | | 20 | | | | |
| $AlPO_4$ | | | | | | | | | 20 | | | |
| alumina | | | | | | | | | | 20 | | |
| spinel | | | | | | | | | | | 20 | |
| kaolin | | | | | | | | | | | | 20 |
| $Nb_2O_5$ | | 0.2 | 0.2 | | 0.2 | 0.2 | | | | | | |
| Firing conditions | | | | | | | | | | | | |
| firing temperature (°C.) | 1,600 | 1,500 | 1,450 | 1,600 | 1,400 | 1,500 | 1,600 | 1,600 | 1,600 | 1,600 | 1,600 | 1,600 |
| firing time (h) | 5 | 10 | 5 | 50 | 40 | 10 | 5 | 5 | 5 | 5 | 5 | 5 |
| Crystalline phase (wt %) | | | | | | | | | | | | |
| zirconyl phosphate | 80 | | | 100 | 99 | 40 | — | — | s | — | m | m |
| zircon | 20 | | | 0 | 1 | 60 | 100 | s | — | — | — | s |
| m-$ZrO_2$ | | w | | | | | | m | w | s | s | m |
| $AlPO_4$ | | | | | | | | m | m | m | w | — |
| Physical properties of sintered body | | | | | | | | | | | | |
| CTE ($\times 10^{-7}$/°C., 40~1400° C.) | | 40 | 33 | 1 | 1 | 35 | 42 | 81 | | | | |
| 4-point flexural strength (kg/mm$^2$) | | | 2.4 | 1 | 2.3 | 14 | 20 | 3.6 | | | | |
| self-weight softening percentage (%, 1300° C. × 5 h) | * | | 1.3 | | | | 0.0 | — | * | * | * | * |
| open porosity (%) | | | 38 | 50 | 30 | 2 | 0 | 9 | | | | |
| melting point (°C.) | | | | | | | >1,650 | — | | | | |

Figure 15:
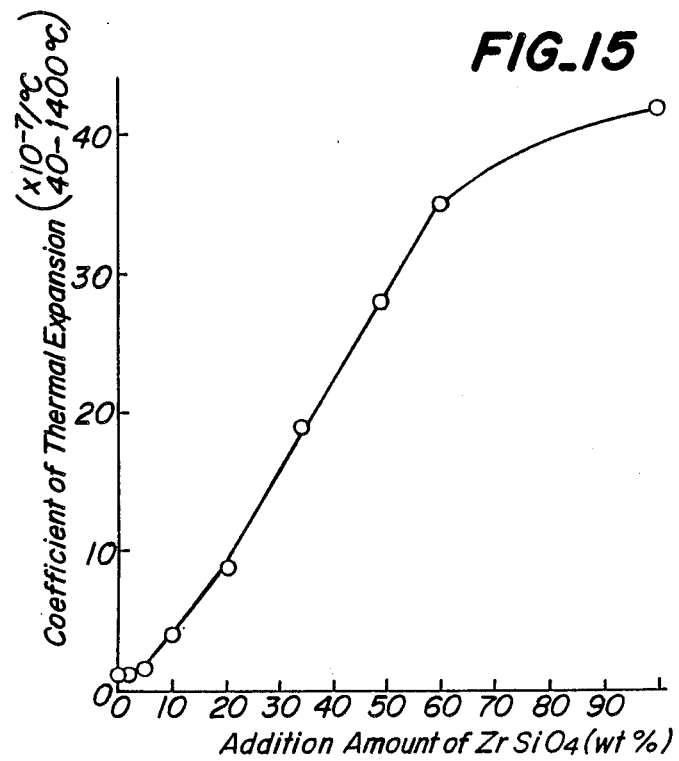
FIG. 15 is a diagram showing the dependency of the coefficient of thermal expansion of the zirconyl phosphate-zircon composite bodies according to the fifth aspect of the present invention upon an addition amount of zircon.
Figure 16:
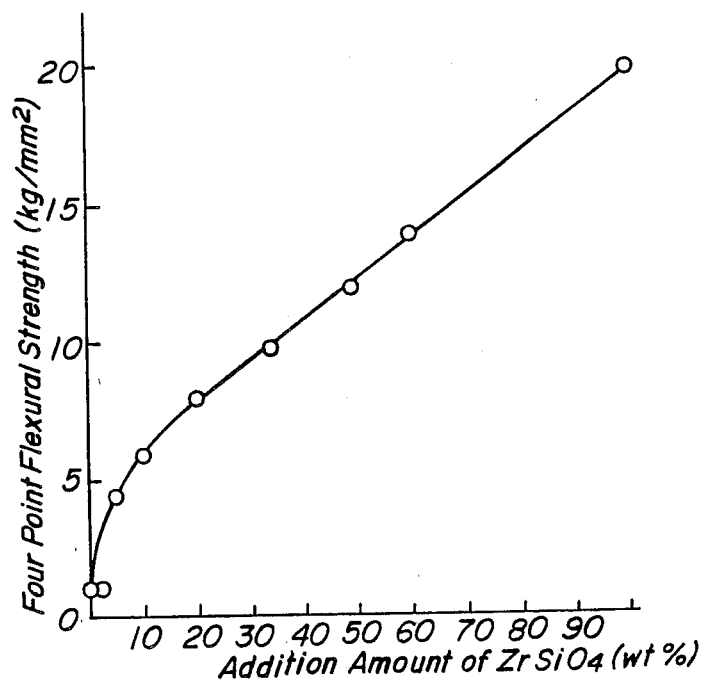
FIG. 16 is a diagram showing the dependency of the four point flexural strength of the zirconyl phosphatezircon composite bodies.

*Grain growth was conspicuous and sample was broken during processing. s: strong, m: medium, w: weak From results of Examples 61 to 68 and Comparative Examples 70 to 83 shown in Table 6, the sintered bodies aimed at by the present invention in which the coefficient of thermal expansion in the temperature range from room temperature to 1,400° C. was not more than $30 \times 10^{-7}$ and the melting point was not less than 1,600° C. could be obtained when $ZrO_2$, $P_2O_5$, $SiO_2$, and $Nb_2O_5$ were contained in amounts of 58.8 to 65.3% by weight, 17.6 to 37.1% by weight, 1.5 to 16.4% by weight, and 0.1 to 4% by weight, respectively, and zirconyl phosphate and zircon were contained as a main crystalline phase and secondary crystalline phase, respectively. Further, such sintered bodies could be obtained by firing a formulated mixture in which 0.1 to 4 parts by weight of $Nb_2O_5$ was added to 100 parts by weight of a batch mixture in which 5 to 50% by weight of zircon was added to zirconyl phosphate under firing conditions shown in Table 5. In this case, it is necessary that with respect to the chemical composition, $ZrO_2$, $P_2O_5$, $SiO_2$, and $Nb_2O_5$ are 58.8 to 65.3% by weight, 17.6 to 37.1% by weight, 1.5 to 16.4% by weight, and 0.1 to 4% by weight, respectively. If $ZrO_2$ exceeds 65.3% by weight, M-$ZrO_2$ precipitates to result in high expansion, while if it is less than 58.8% by weight, $ZrP_2O_7$ precipitates to result in high expansion. Also, if $P_2O_5$ exceeds 37.1% by weight, $ZrP_2O_7$ precipitates to result in high expansion, while if it is less than 17.6% by weight, m-$ZrO_2$ precipitates to result in high expansion. If $SiO_2$ exceeds 16.4% by weight, an amount of zircon precipitated exceeds 50% by weight to result in high expansion, while if it is less than 1.5% by weight, the amount of zircon precipitated is less than 5% by weight, so that an effect of improving strength cannot fully be obtained. If $Nb_2O_5$ exceeds 4% by weight, heat resistance of the sintered body unfavorably lowers. The amount of zircon precipitated is particularly desirably 5 to 35% by weight. In this case, the chemical composition is that $ZrO_2$, $P_2O_5$, $SiO_2$, and $Nb_2O_5$ are 58.5 to 64.7% by weight, 22.7 to 37.1% by weight, 1.5 to 11.5% by weight, and 0.1 to 4% by weight, respectively, and the coefficient of thermal expansion in a temperature range from room temperature to 1,400° C. is as low as not more than $20 \times 10^{-7}$/°C. FIG. 15 shows the relation between the addition amount of zircon and the coefficient of thermal expansion, and FIG. 16 shows the relationship between the addition amount of zircon and the four point flexural strength.

Figure 17:
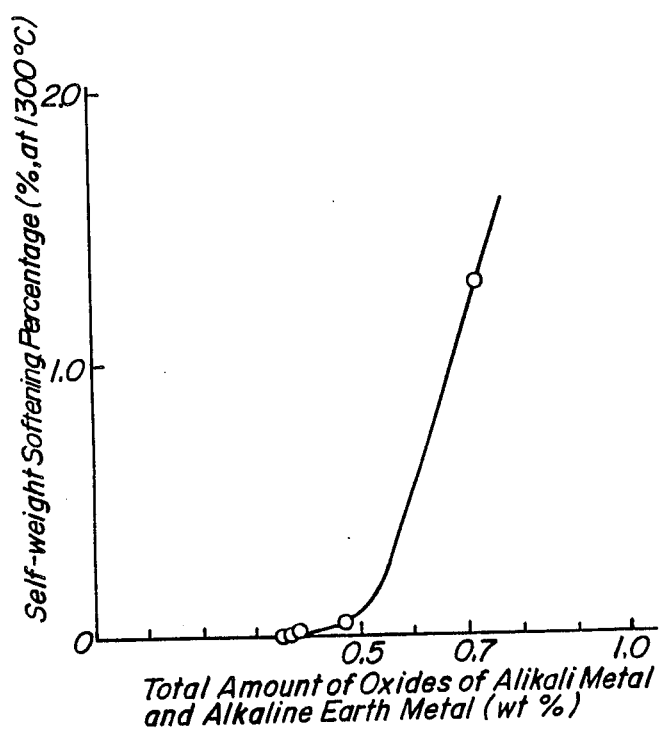
FIG. 17 is a diagram showing the relationship between the self-weight softening percentage at 1,300° C. of the zirconyl phosphate-zircon composite bodies and a total amount of oxides of an alkali metal and an alkaline earth metal.
Figure 18:
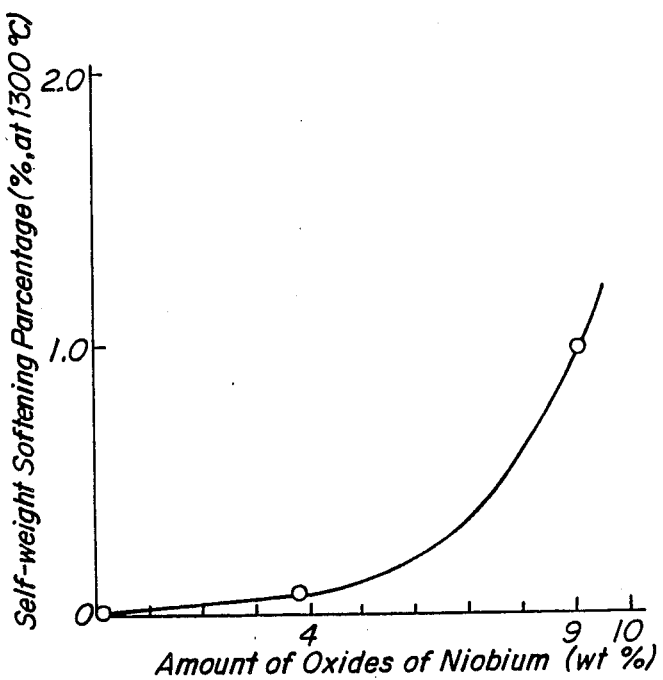
FIG. 18 is a diagram showing the relation between the self-weight softening percentage at 1,300° C. of the zirconyl phosphate-zircon composite bodies and the addition amount of $Nb_2O_5$.

Further, as obvious from FIG. 17 showing the relationship between the self-weight softening percentage at 1,300° C. and the total amount of oxides of an alkali metal and an alkaline earth metal in the zirconyl phosphate-zircon complex sintered bodies and FIG. 18 showing relation between the self-weight softening percentage at 1,300° C. and the amount of $Nb_2O_5$, if the total amount to of the oxides of the alkali metal and the alkaline earth metal in the sintered body exceeds 0.5% by weight, the self-weight softening percentage at 1,300° C. increases and the heat resistance lowers. In order to obtain sintered bodies free from the above disadvantages, it is necessary that the total amount of the oxides of the alkali metal and the alkaline earth metal contained in the zirconyl phosphate starting material, the zircon starting material, and the $Nb_2O_5$ starting material is not more than 0.5% by weight.

Figure 19:
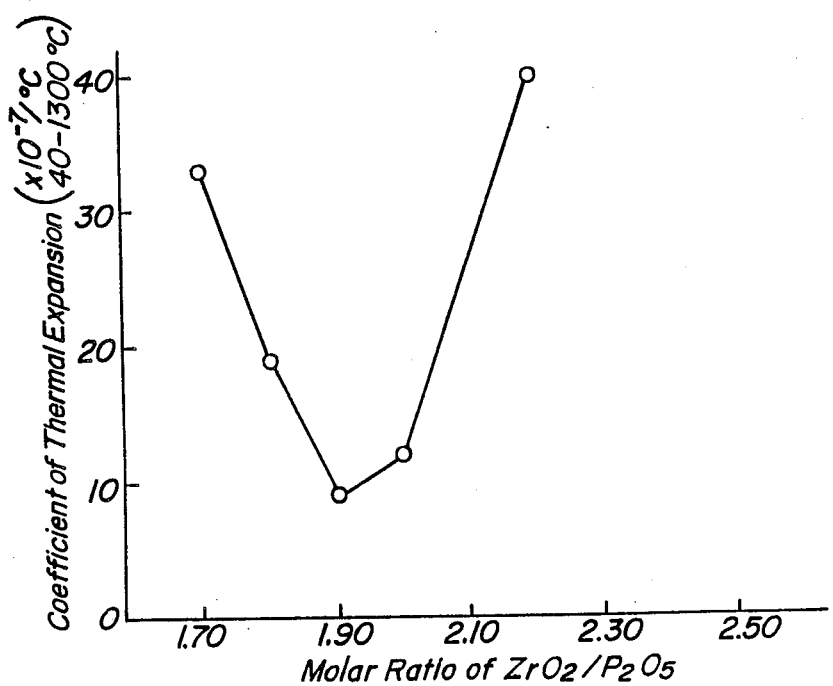
FIG. 19 is a diagram showing the relationship between the molar ratio of $ZrO_2/P_2O_5$ in a zirconyl phosphate starting material used for the production of the zirconyl phosphate-zircon composite bodies and the coefficient of thermal expansion of the zirconyl phosphate-zircon complex sintered bodies.

It is also important to control the molar ratio between $ZrO_2$ and $P_2O_5$ in the zirconyl starting material in a range from 1.80 to 2.00. If the molar ratio exceeds 2.00, the sintered body undergoes serious damages, because of increased coefficient of thermal expansion of the sintered body due to the precipitation of monoclinic $ZrO_2$, rapid shrinkage due to the phase transformation of $ZrO_2$ from the monoclinic system to the tetragonal system, and rapid expansion due to the phase transformation of $ZrO_2$ from the tetragonal phase to the monoclinic system. Thus, the sintered body cannot be practically used. If this value is less than 1.80, since a sufficient amount of the $(ZrO)_2P_2O_7$ phase does not precipitate, the coefficient of thermal expansion of the sintered body increases. Thus, the sintered body cannot be used as a low expansion material. FIG. 19 shows the relationship between the molar ratio of $ZrO_2/P_2O_5$ and the coefficient of thermal expansion.

Figure 20:
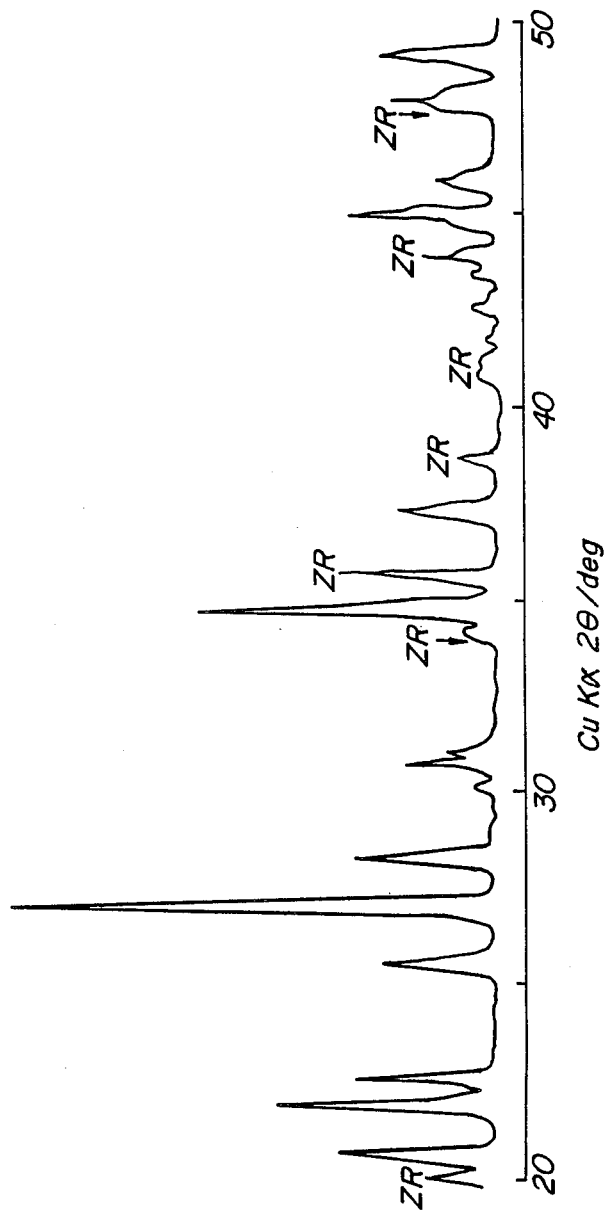
FIG. 20 is a diagram showing an X ray diffraction pattern of a zirconyl phosphate-zircon composite body in Example 63 in which Zr denotes peaks of zircon.

FIG. 20 shows an X-ray diffraction pattern of a zirconyl phosphate-zircon complex sintered body in Example 63. It is seen that a main component of the crystalline phase is zirconyl phosphate and a secondary crystalline phase is zircon (ZR denotes peak of zircon).

Figure 21:
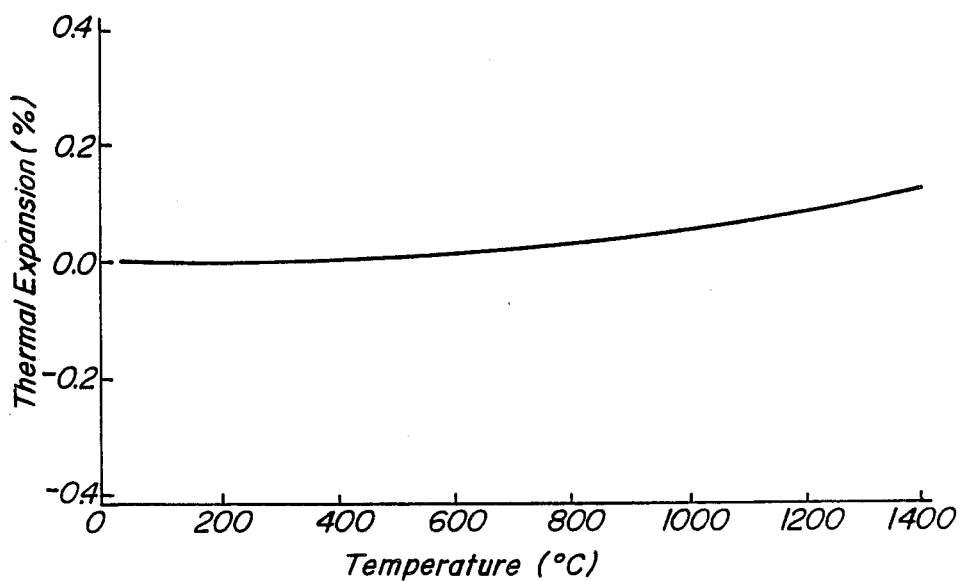
FIG. 21 is a diagram showing a thermal expansion curve of the zirconyl phosphate-zircon composite body in Example 63.

FIG. 21 shows a thermal expansion curve of the zirconyl phosphate-zircon complex sintered body in Example 63. It is seen that the sintered body did not soften in a temperature range from room temperature to 1,400° C.

As obvious from the above explanation, according to the heat resisting low expansion zirconyl phosphatezircon composite sintered bodies and their producing process in the present invention, the heat resisting low expansion ceramic materials in which the coefficient of thermal expansion in a temperature range from room temperature to 1,400° C. is not more than $30 \times 10^{-7}$/°C. and the melting point is not less than 1,600° C. can be obtained when a chemical composition in which $ZrO_2$, $P_2O_5$ and $SiO_2$, and optionally further MgO and $Al_2O_3$ or $Nb_2O_5$ are contained in a specific amounts, and zirconyl phosphate and zircon are contained as the main crystalline phase and the secondary crystalline phase, respectively.

Owing to this, applicable fields in which the zirconyl phosphate-zircon complex sintered bodies may be used as low expansion materials required to be thermal shock resisting are wide. The complex sintered bodies according to the present invention have sufficiently wide practical applicability, for instance, when the moldings are shaped in a honeycomb structure by extrusion molding or the like, they can be used as rotary heat regenerating type ceramic heat exchangers, heat conductive type heat exchangers, and the like. Further, when the molding are shaped by slip casting or, press molding, injection molding, or the like, the complex sintered bodies can be used as heat insulating materials for use in housings of ceramic turbocharger rotors, or engine manifolds.

What is claimed is:

1. A heat resisting low expansion zirconyl phosphate-zircon composite body having microcracks therein and containing zirconyl phosphate and zircon as a main crystalline phase and a secondary crystalline phase, respectively, said body having a chemical composition consisting essentially of 58.2 to 65.4% by weight $ZrO_2$, 17.4 to 37.1% by weight of $P_2O_5$ and 1.5 to 19% by weight of $SiO_2$, said body having a coefficient of thermal expansion in a temperature range from room temperature to 1,400° C. of not more than $30 \times 10^{-7}$/°C., a melting point of not less and 1,600° C. and a self-weight softening percentage of not more than 0.1%.

2. A heat resisting low expansion zirconyl phosphate-zircon composite body according to claim 1, which consist essentially of 58.2 to 64.8% by weight of $ZrO_2$, 22.5 to 37.1% by weight of $P_2O_5$ and 1.5 to 14.1% by weight of $SiO_2$ in the chemical composition and has a coefficient of thermal expansion in a temperature range from room temperature to 1,400° C. of not more than $20 \times 10^{-7}$/°C.

3. A heat resisting low expansion zirconyl phosphate-zircon composite body according to claim 1, which has a chemical composition consisting essentially of 61.3 to 65.4% by weight of $ZrO_2$, 18.3 to 37.1% by weight of $P_2O_5$, and 1.6 to 16.4% by weight of $SiO_2$.

4. A heat resisting low expansion zirconyl phosphate-zircon composite body according to claim 1, which consists essentially of 61.3 to 64.8% by weight of $ZrO_2$, 23.7 to 37.1% by weight of $P_2O_5$ and 1.6 to 11.5% by weight of $SiO_2$ in the chemical composition and has a coefficient of thermal expansion in the temperature range from room temperature to 1,400° C. of not more than $20 \times 10^{-7}$/°C.

5. A heat resisting low expansion zirconyl phosphate-zircon composite body according to claim 1, wherein a total amount of oxides of an alkali metal and an alkaline earth metal is not more than 0.5% by weight.

6. A heat resisting low expansion zirconyl phosphate-zircon composite body according to claim 1, which consists essentially of 58.2 to 65.3% by weight of $ZrO_2$, 17.4 to 37.1% by weight of $P_2O_5$, 1.6 to 19.0% by weight of $SiO_2$, and the balance being MgO and $Al_2O_3$ in a total amount of not more than 2.5% by weight.

7. A heat resisting low expansion zirconyl phosphate-zircon composite body according to claim 6, which consists essentially of 58.2 to 64.7% by weight of $ZrO_2$, 22.5 to 37.1% by weight of $P_2O_5$, 1.6 to 14.1% by weight of $SiO_2$, and the balance being MgO and $Al_2O_3$ in a total amount of not more than 2.5% by weight, and has a coefficient of thermal expansion in a temperature range from room temperature to 1,400° C. of not more than $20 \times 10^{-7}$/°C.

8. A heat resisting low expansion zirconyl phosphate-zircon composite body according to claim 6, wherein a total amount of oxides of an alkali metal and an alkaline earth metal, excluding MgO, is not more than 0.5% by weight.

9. A heat resisting low expansion zirconyl phosphate-zircon composite body according to claim 1, which has a chemical composition consisting essentially of 58.8 to 65.3% by weight of $ZrO_2$, 17.6 to 37.1% by weight of $P_2O_5$, 1.5 to 16.4% by weight of $SiO_2$, and 0.1 to 7% by weight of $Nb_2O_5$.

10. A heat resisting low expansion zirconyl phosphate-zircon composite body according to claim 9, which has the chemical composition consisting essentially of 58.8 to 64.7% by weight of $ZrO_2$, 22.7 to 37.1% by weight of $P_2O_5$, 1.5 to 11.5% by weight of $SiO_2$, and 0.1 to 4% by weight of $Nb_2O_5$, wherein the coefficient of thermal expansion at the temperature range from room temperature to 1,400° C. is not more than $20 \times 10^{-7}$/°C.

11. A heat resisting low expansion zirconyl phosphate-zircon composite body according to claim 9, wherein the total amount of oxides of an alkali metal and an alkaline earth metal is not more than 0.5% by weight.

12. A process for producing a zirconyl phosphate-zircon composite body containing zirconyl phosphate and zircon as a main crystalline phase and a secondary crystalline phase, respectively, wherein a coefficient of thermal expansion in a temperature range from room temperature to 1,400° C. is not more than $30 \times 10^{-7}$/°C. and a meeting point is not less than 1600° C., said process comprising adding 5 to 50% by weight of batch mixture, molding said batch mixture to form a shaped body, drying said shaped body and sintering said shaped body for 3-20 hours in a temperature range of 1400°–1650° C. in an air atmosphere.

13. A process for producing a zirconyl phosphatezircon composite body according to claim 12, wherein an addition amount of zircon is from 5 to 35% by weight and the coefficient of thermal expansion in a temperature range from room temperature to 1,400° C. is not more than $20 \times 10^{-7}/°C$.

14. A process for proeducing a zirconyl phosphatezircon composite body according to claim 12, wherein the zirconyl phosphate and zircon contain not more than 0.5% by weight of oxides of an alkali metal and an alkaline earth metal.

15. A process for producing a zirconyl phosphate-zircon composite body according to claim 13, wherein 0.1 to 5 parts by weight of cordierite ($2MgO.2Al_2O_3.5SiO_2$) is added to 100 parts by weight of the batch mixture before the batch mixture is molded to form a shaped body.

16. A process for producing a zirconyl phosphatezircon composite body according to claim 13, wherein a molar ratio of $ZrO_2/P_2O_5$ in a zirconyl phosphate starting material is 1.8 to 2.00.

17. A process for producing a zirconyl phosphatezircon composite body according to claim 15, wherein 0.1 to 4 parts by weight of $Nb_2O_5$ is added to 100 parts by weight of the batch mixture before the batch mixture is molded to form a shaped body.

18. A process for producing a zirconyl phosphatezircon zircon composite body according to claim 17, wherein the $Nb_2O_5$ contains not more than 0.5% by weight of alkali metal oxides and alkaline earth metal oxides.

19. A process for producing a zirconyl phosphatezircon composite body according to claim 17, wherein the cordierite contains not more than 1% by weight of alkali metal oxides and alkaline earth metal oxides, excluding MgO.

* * * * *